(12) United States Patent
Hu et al.

(10) Patent No.: US 12,197,804 B2
(45) Date of Patent: Jan. 14, 2025

(54) DISPLAY CONTROL METHOD, TERMINAL, AND STORAGE MEDIUM

(71) Applicant: Huawei Technologies Co., Ltd., Shenzhen (CN)

(72) Inventors: Kai Hu, Shenzhen (CN); Xiao Xiao, Shenzhen (CN); Qiyi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 18/247,006

(22) PCT Filed: Aug. 25, 2021

(86) PCT No.: PCT/CN2021/114419
§ 371 (c)(1),
(2) Date: Mar. 28, 2023

(87) PCT Pub. No.: WO2022/068470
PCT Pub. Date: Apr. 7, 2022

(65) Prior Publication Data
US 2023/0367533 A1 Nov. 16, 2023

(30) Foreign Application Priority Data

Sep. 29, 2020 (CN) .......................... 202011052817.5

(51) Int. Cl.
*G06F 3/048* (2013.01)
*G06F 1/16* (2006.01)
*G06F 3/14* (2006.01)

(52) U.S. Cl.
CPC .......... *G06F 3/1423* (2013.01); *G06F 1/1641* (2013.01); *G06F 1/1647* (2013.01)

(58) Field of Classification Search
CPC .... G06F 3/1423; G06F 1/1641; G06F 1/1647; G06F 1/1616; G06F 1/1652;
(Continued)

(56) References Cited

U.S. PATENT DOCUMENTS

2007/0198948 A1 * 8/2007 Toriyama ................ A63F 13/92
715/788
2010/0064244 A1 * 3/2010 Kilpatrick, II ...... H04M 1/0243
345/1.3

(Continued)

FOREIGN PATENT DOCUMENTS

| EP | 3896558 A1 * | 10/2021 | ........... G06F 1/1616 |
| EP | 3975531 A1 * | 3/2022 | ........... G06F 1/1616 |

(Continued)

*Primary Examiner* — Temesghen Ghebretinsae
*Assistant Examiner* — Sosina Abebe
(74) *Attorney, Agent, or Firm* — Slater Matsil, LLP

(57) ABSTRACT

A method includes: in response to a dual-screen display instruction, entering a dual-screen display phase; in the dual-screen display phase, controlling a first display interface to be switched between a first display screen and a first display sub-screen in a time-division manner; and when the first display interface is switched to the first display screen, transmitting data of a first image to the first display screen through the first display interface, or when the first display interface is switched to the first display sub-screen, transmitting data of a second image to the first display sub-screen through the first display interface, so that the first display sub-screen displays the second image at the same time when the first display screen displays the first image.

20 Claims, 11 Drawing Sheets

(58) Field of Classification Search
CPC .... G06F 1/3228; G06F 1/3265; G06F 1/1677; G06F 3/048; G09G 2380/02; G09G 5/006; G09G 5/14; H04M 1/02; H04M 1/72448; H04M 1/725

See application file for complete search history.

(56) References Cited

U.S. PATENT DOCUMENTS

| | | | | |
|---|---|---|---|---|
| 2010/0182265 | A1* | 7/2010 | Kim | G06F 1/1641 345/1.3 |
| 2010/0225601 | A1* | 9/2010 | Homma | G06F 3/0488 345/173 |
| 2010/0245209 | A1* | 9/2010 | Miller | G06F 1/1618 345/1.3 |
| 2010/0259515 | A1* | 10/2010 | Kohara | G06F 1/1677 345/204 |
| 2011/0187662 | A1* | 8/2011 | Lee | G06F 1/1616 345/1.3 |
| 2011/0292081 | A1* | 12/2011 | Matsunobu | G06F 3/1423 345/655 |
| 2012/0144323 | A1* | 6/2012 | Sirpal | G06F 3/1431 715/761 |
| 2012/0214552 | A1* | 8/2012 | Sirpal | G06F 3/0483 455/566 |
| 2012/0229374 | A1* | 9/2012 | Kobayashi | G06F 1/1647 345/4 |
| 2012/0242702 | A1* | 9/2012 | Sirpal | H04M 1/724 345/649 |
| 2013/0135182 | A1* | 5/2013 | Jung | G06F 1/1652 345/30 |
| 2013/0239050 | A1* | 9/2013 | Ohashi | G06F 3/0481 715/800 |
| 2013/0321264 | A1* | 12/2013 | Park | G06F 3/0482 345/156 |
| 2013/0321340 | A1* | 12/2013 | Seo | G06F 3/04845 345/174 |
| 2014/0098028 | A1* | 4/2014 | Kwak | G06F 1/1652 345/173 |
| 2014/0101560 | A1* | 4/2014 | Kwak | G06F 3/0488 715/788 |
| 2014/0101575 | A1* | 4/2014 | Kwak | G06F 3/0486 715/761 |
| 2014/0101576 | A1* | 4/2014 | Kwak | G06F 1/1618 715/761 |
| 2014/0101577 | A1* | 4/2014 | Kwak | G06F 3/1431 715/761 |
| 2014/0184489 | A1* | 7/2014 | Ma | G06F 1/1677 345/156 |
| 2015/0022436 | A1* | 1/2015 | Cho | G06F 1/1615 345/156 |
| 2015/0116362 | A1* | 4/2015 | Aurongzeb | G06F 3/1446 345/650 |
| 2015/0227224 | A1* | 8/2015 | Park | G06F 3/0488 345/173 |
| 2015/0255023 | A1* | 9/2015 | Lee | H05K 1/028 345/204 |
| 2015/0325216 | A1* | 11/2015 | Park | G06F 1/16 345/634 |
| 2015/0338888 | A1* | 11/2015 | Kim | G06F 1/1677 345/156 |
| 2016/0085325 | A1* | 3/2016 | Lee | G06F 3/0488 345/173 |
| 2016/0098063 | A1* | 4/2016 | Lee | G09G 5/38 345/173 |
| 2016/0184700 | A1* | 6/2016 | Lee | G06F 3/1423 463/31 |
| 2016/0224213 | A1* | 8/2016 | Chen | G06F 3/0485 |
| 2016/0259514 | A1* | 9/2016 | Sang | G06F 3/017 |
| 2016/0291762 | A1* | 10/2016 | Kim | G06F 3/0488 |
| 2016/0381014 | A1* | 12/2016 | Kim | G06F 1/1652 726/7 |
| 2017/0220307 | A1* | 8/2017 | Da Silva Ramos | G06F 3/1438 |
| 2017/0293383 | A1* | 10/2017 | Lee | G06F 1/1641 |
| 2018/0011676 | A1* | 1/2018 | Han | G06F 3/013 |
| 2018/0027175 | A1* | 1/2018 | Cho | G01C 21/3661 348/584 |
| 2018/0039387 | A1* | 2/2018 | Cheong | G06F 1/1652 |
| 2018/0039408 | A1* | 2/2018 | Cheong | G06F 3/0481 |
| 2018/0059822 | A1* | 3/2018 | Seo | G06F 1/1652 |
| 2018/0081398 | A1* | 3/2018 | Shin | H04M 1/0268 |
| 2018/0113520 | A1* | 4/2018 | Klein | G06F 1/1641 |
| 2018/0129459 | A1* | 5/2018 | Sylvan | G06F 3/1423 |
| 2018/0181233 | A1* | 6/2018 | Li | G06F 3/0445 |
| 2018/0356904 | A1* | 12/2018 | Disano | G06F 3/0488 |
| 2020/0225706 | A1* | 7/2020 | Jung | G09F 9/301 |
| 2020/0278720 | A1* | 9/2020 | Kim | G06F 1/1647 |
| 2020/0365110 | A1* | 11/2020 | Iyer | G06F 3/147 |
| 2021/0096675 | A1* | 4/2021 | Klein | G06F 3/0481 |
| 2021/0124452 | A1* | 4/2021 | Hong | G06F 3/0416 |
| 2021/0263564 | A1* | 8/2021 | Chen | G06F 3/0481 |
| 2021/0327328 | A1* | 10/2021 | Liu | G09G 3/20 |
| 2022/0066724 | A1* | 3/2022 | Moon | G06F 1/1681 |
| 2022/0179455 | A1* | 6/2022 | Zhu | G06F 3/0488 |
| 2022/0358864 | A1* | 11/2022 | Hu | G09G 3/035 |
| 2023/0044497 | A1* | 2/2023 | Zhang | G06F 3/1423 |

FOREIGN PATENT DOCUMENTS

| | | | | |
|---|---|---|---|---|
| EP | 4020152 | A1 * | 6/2022 | G06F 1/1616 |
| WO | WO-2018191900 | A1 * | 10/2018 | G06F 1/1641 |

* cited by examiner

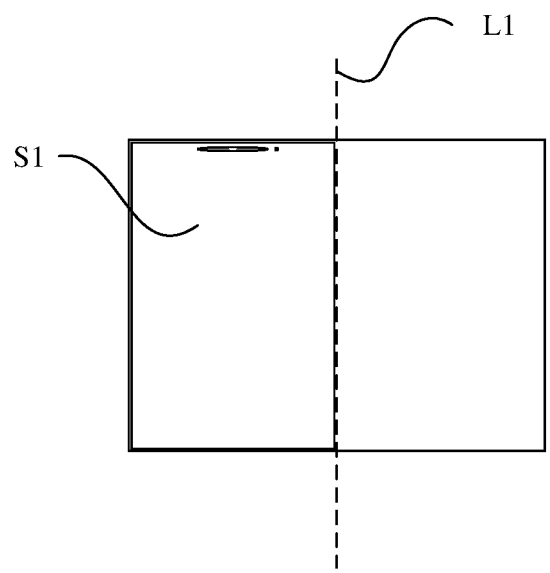
FIG. 1A
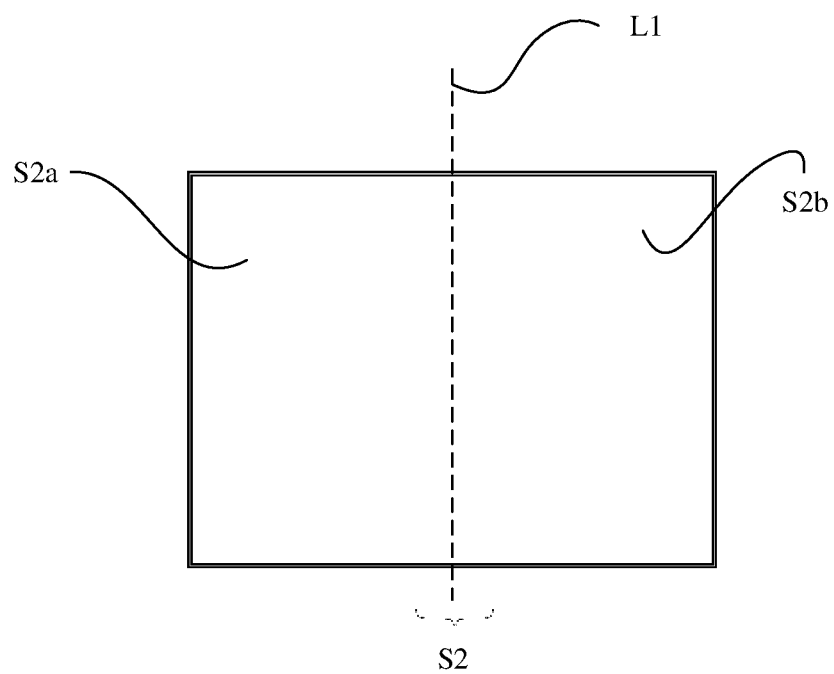

DISPLAY CONTROL METHOD, TERMINAL, AND STORAGE MEDIUM

CROSS-REFERENCE TO RELATED APPLICATIONS

This application is a National Stage of International Patent Application No. PCT/CN2021/114419, filed on Aug. 25, 2021, which claims priority to Chinese Patent Application No. 202011052817.5, filed on Sep. 29, 2020. Both of the aforementioned applications are hereby incorporated by reference in their entireties.

TECHNICAL FIELD

This application relates to the field of display control technologies, and in particular, to a display control method, a terminal, and a storage medium.

BACKGROUND

With development of display technologies, foldable dual-screen mobile phones gradually enter people's life, and the foldable dual-screen mobile phones further improve user experience. In a conventional technology, there is an existing implementation solution for simultaneous display of dual screens. However, based on a capability of an existing mobile phone chip, controlling simultaneous display of the dual screens imposes a relatively large limitation on resolution of the display screens. Therefore, in the conventional technology, with a limitation of a processing capability of the existing mobile phone chip, simultaneous display of the dual screens needs to be implemented at the cost of the resolution of the display screens.

SUMMARY

This application provides a display control method, a terminal, and a storage medium. According to the display control method, in a dual-screen display phase, a first display interface of a terminal having a foldable display screen is controlled to be switched between a first display screen and a first display sub-screen of a second display screen in a time-division manner. In this way, when the first display interface is switched to the first display screen, data of a first image is transmitted to the first display screen through the first display interface, or when the first display interface is switched to the first display sub-screen, data of a second image is transmitted to the first display sub-screen through the first display interface, so that the first display sub-screen displays the second image at the same time when the first display screen displays the first image. Therefore, according to the foregoing solution, time division multiplexing may be performed on a display interface when a processing capability of a terminal chip is not changed. This ensures that simultaneous display of dual display screens (the first display screen and the first display sub-screen of the second display screen) can be implemented in the dual-screen display phase without sacrificing resolution of the display screens.

This application provides a display control method, applied to a terminal having a foldable display screen. The terminal includes a first display screen and a second display screen. The second display screen is a foldable screen, and when the foldable screen is in an unfolded state, a light emitting direction of the first display screen is opposite to a light emitting direction of the second display screen. The second display screen includes a first display sub-screen and a second display sub-screen. The method includes:

in response to a dual-screen display instruction, entering a dual-screen display phase; in the dual-screen display phase, controlling a first display interface to be switched between the first display screen and the first display sub-screen in a time-division manner; and when the first display interface is switched to the first display screen, transmitting data of a first image to the first display screen through the first display interface, or when the first display interface is switched to the first display sub-screen, transmitting data of a second image to the first display sub-screen through the first display interface, so that the first display sub-screen displays the second image at the same time when the first display screen displays the first image.

Further, the dual-screen display phase includes:

generating a primary screen image and a secondary screen image; and determining a current bending status of the second display screen, determining a primary screen and a secondary screen based on the current bending status of the second display screen, displaying the primary screen image on the primary screen, and displaying the secondary screen image on the secondary screen.

Further, the determining a current bending status of the second display screen, determining a primary screen and a secondary screen based on the current bending status of the second display screen, displaying the primary screen image on the primary screen, and displaying the secondary screen image on the secondary screen includes:

if the second display screen is in an inward-bending state, setting the first display screen to the primary screen, and setting the first display sub-screen and the second display sub-screen to the secondary screen, where the first image is the primary screen image, and the second image is secondary screen images;

controlling the first display interface to be switched between the first display screen and the first display sub-screen in a time-division manner; and when the first display interface is switched to the first display screen, transmitting data of the primary screen image to the first display screen through the first display interface, or when the first display interface is switched to the first display sub-screen, transmitting data of the secondary screen image to the first display sub-screen through the first display interface, so that the first display sub-screen displays the secondary screen image at the same time when the first display screen displays the primary screen image; and transmitting data of a third image to the second display sub-screen through a second display interface, so that the second display sub-screen displays the secondary screen image, where the third image is the secondary screen image, and the first display sub-screen and the second display sub-screen respectively perform self-refresh displaying based on the secondary screen image received by the first display sub-screen and the secondary screen image received by the second display sub-screen.

Further, the determining a current bending status of the second display screen, determining a primary screen and a secondary screen based on the current bending status of the second display screen, displaying the primary screen image on the primary screen, and displaying the secondary screen image on the secondary screen includes:

if the second display screen is in an inward-bending state, setting the first display screen to the primary screen, and setting the first display sub-screen and the second display sub-screen to secondary screens, where the first image is the primary screen image, and the second image is the secondary screen image;

controlling the first display interface to be switched between the first display screen and the first display sub-screen in a time-division manner; and when the first display interface is switched to the first display screen, transmitting data of the primary screen image to the first display screen through the first display interface, or when the first display interface is switched to the first display sub-screen, transmitting data of a part of the secondary screen image to the first display sub-screen through the first display interface, so that the first display sub-screen displays the part of the secondary screen image at the same time when the first display screen displays the primary screen image; and transmitting data of a third image to the second display sub-screen through a second display interface, so that the second display sub-screen displays the other part of the secondary screen image, and the second display screen formed by the first display sub-screen and the second display sub-screen displays the complete secondary screen image, where the third image is the other part of the secondary screen image, and the first display sub-screen and the second display sub-screen respectively perform self-refresh displaying based on the part of the secondary screen image received by the first display sub-screen and the part of the secondary screen image received by the second display sub-screen.

Further, the determining a current bending status of the second display screen, determining a primary screen and a secondary screen based on the current bending status of the second display screen, displaying the primary screen image on the primary screen, and displaying the secondary screen image on the secondary screen includes:

if the second display screen is in an unfolded state, setting the second display screen to the primary screen, and setting the first display screen to the secondary screen, where the first image is the secondary screen image, and the second image is a part of the primary screen image;

controlling the first display interface to be switched between the first display screen and the first display sub-screen in a time-division manner; and when the first display interface is switched to the first display screen, transmitting data of the secondary screen image to the first display screen through the first display interface, where the first display screen performs self-refresh displaying based on the received secondary screen image, or when the first display interface is switched to the first display sub-screen, transmitting data of the part of the primary screen image to the first display sub-screen through the first display interface, so that the first display sub-screen displays the secondary screen image at the same time when the first display screen displays the part of the primary screen image; and transmitting data of a third image to the second display sub-screen through a second display interface, so that the second display sub-screen displays the other part of the primary screen image, and the second display screen formed by the first display sub-screen and the second display sub-screen displays the complete primary screen image, where the third image is the other part of the primary screen image.

Further, the dual-screen display phase includes:

generating a primary screen image and a secondary screen image; and determining a current bending status of the second display screen and an orientation of the terminal, determining a primary screen and a secondary screen based on the current bending status of the second display screen and the orientation of the terminal, displaying the primary screen image on the primary screen, and displaying the secondary screen image on the secondary screen.

Further, the determining a current bending status of the second display screen and an orientation of the terminal, determining a primary screen and a secondary screen based on the current bending status of the second display screen and the orientation of the terminal, displaying the primary screen image on the primary screen, and displaying the secondary screen image on the secondary screen includes:

if the second display screen is in an unfolded state, and the second display screen faces a user, setting the second display screen to the primary screen, and setting the first display screen to the secondary screen, where the first image is the secondary screen image, and the second image is a part of the primary screen image;

controlling the first display interface to be switched between the first display screen and the first display sub-screen in a time-division manner; and when the first display interface is switched to the first display screen, transmitting data of the secondary screen image to the first display screen through the first display interface, where the first display screen performs self-refresh displaying based on the received secondary screen image, or when the first display interface is switched to the first display sub-screen, transmitting data of the part of the primary screen image to the first display sub-screen through the first display interface, so that the first display sub-screen displays the secondary screen image at the same time when the first display screen displays the part of the primary screen image; and transmitting data of a third image to the second display sub-screen through a second display interface, so that the second display sub-screen displays the other part of the primary screen image, and the second display screen formed by the first display sub-screen and the second display sub-screen displays the complete primary screen image, where the third image is the other part of the primary screen image.

Further, the determining a current bending status of the second display screen and an orientation of the terminal, determining a primary screen and a secondary screen based on the current bending status of the second display screen and the orientation of the terminal, displaying the primary screen image on the primary screen, and displaying the secondary screen image on the secondary screen includes: if the second display screen is in an unfolded state, and the first display screen faces a user, setting the first display screen to the primary screen, and setting the second display screen to the secondary screen; controlling the first display interface to be switched between the first display screen and the first display sub-screen in a time-division manner; and when the first display interface is switched to the first display screen, transmitting data of the primary screen image to the first display screen through the first display interface, or when the first display interface is switched to the first display sub-screen, transmitting data of a part of the secondary screen image to the first display sub-screen through the first display interface, so that the first display sub-screen displays the part of the secondary screen image at the same time when the first display screen displays the primary screen image; and transmitting data of a third image to the second display sub-screen through a second display interface, so that the second display sub-screen displays the other part of the secondary screen image, and the second display screen formed by the first display sub-screen and the second display sub-screen displays the complete secondary screen image, where the third image is the other part of the secondary screen image, and the first display sub-screen and the second display sub-screen respectively perform self-refresh displaying based on the part of the secondary screen image received by the first display sub-screen and the part of the secondary screen image received by the second display sub-screen.

Further, the determining a current bending status of the second display screen and an orientation of the terminal, determining a primary screen and a secondary screen based on the current bending status of the second display screen and the orientation of the terminal, displaying the primary screen image on the primary screen, and displaying the secondary screen image on the secondary screen includes: if the second display screen is in an outward-bending state, and the first display sub-screen faces a user, setting the first display sub-screen to the primary screen, and setting the first display screen and the second display sub-screen to secondary screens; controlling the first display interface to be switched between the first display screen and the first display sub-screen in a time-division manner; and when the first display interface is switched to the first display screen, transmitting data of the secondary screen image to the first display screen through the first display interface, or when the first display interface is switched to the first display sub-screen, transmitting data of the primary screen image to the first display sub-screen through the first display interface, so that the first display sub-screen displays the primary screen image at the same time when the first display screen displays the secondary screen image; and transmitting data of a third image to the second display sub-screen through a second display interface, so that the second display sub-screen displays the secondary screen image, where the third image is the secondary screen image, and the first display screen and the second display sub-screen respectively perform self-refresh displaying based on the secondary screen image received by the first display screen and the secondary screen image received by the second display sub-screen.

Further, the determining a current bending status of the second display screen and an orientation of the terminal, determining a primary screen and a secondary screen based on the current bending status of the second display screen and the orientation of the terminal, displaying the primary screen image on the primary screen, and displaying the secondary screen image on the secondary screen includes: if the second display screen is in an outward-bending state, and the second display sub-screen faces a user, setting the second display sub-screen to the primary screen, and setting the first display screen and the first display sub-screen to secondary screens; controlling the first display interface to be switched between the first display screen and the first display sub-screen in a time-division manner; and when the first display interface is switched to the first display screen, transmitting data of the secondary screen image to the first display screen through the first display interface, or when the first display interface is switched to the first display sub-screen, transmitting data of the secondary screen image to the first display sub-screen through the first display interface, so that the first display sub-screen displays the secondary screen image at the same time when the first display screen displays the secondary screen image; and transmitting data of a third image to the second display sub-screen through a second display interface, so that the second display sub-screen displays the primary screen image, where the third image is the primary screen image, and the first display screen and the first display sub-screen respectively perform self-refresh displaying based on the secondary screen image received by the first display screen and the secondary screen image received by the first display sub-screen.

The dual-screen display instruction is any one or more of the following instructions: a power-on instruction, an active power-off instruction, a low-battery power-off instruction, a power-off charging instruction, and a system recovery instruction.

This application further provides a terminal, including: a processor and a memory, where the memory is configured to store at least one instruction, and when the instruction is loaded and executed by the processor, the foregoing display control method is implemented.

This application further provides a computer-readable storage medium, where the computer-readable storage medium stores a computer program, and when the computer program is executed by a processor, the foregoing display control method is implemented.

According to the foregoing technical solution, in the dual-screen display phase, the first display interface of the terminal having a foldable display screen is controlled to be switched between the first display screen and the first display sub-screen of the second display screen in a time-division manner. In this way, when the first display interface is switched to the first display screen, the data of the first image is transmitted to the first display screen through the first display interface, or when the first display interface is switched to the first display sub-screen, the data of the second image is transmitted to the first display sub-screen through the first display interface, so that the first display sub-screen displays the second image at the same time when the first display screen displays the first image. Therefore, according to the foregoing solution, time division multiplexing may be performed on a display interface when a processing capability of a terminal chip is not changed. This ensures that simultaneous display of dual display screens (the first display screen and the first display sub-screen of the second display screen) can be implemented in the dual-screen display phase without sacrificing resolution of the display screens.

BRIEF DESCRIPTION OF THE DRAWINGS

To describe the technical solutions in embodiments of the present invention or in the prior art more clearly, the following briefly describes the accompanying drawings for describing the embodiments or the prior art. It is clear that, the accompanying drawings in the following description show some embodiments of the present invention, and a person of ordinary skill in the art may still derive other drawings from these accompanying drawings without creative efforts.

FIG. 1A is a schematic diagram of a side of a first display screen of a terminal according to an embodiment of the present invention;

FIG. 1B is a schematic diagram of a side of a second display screen of a terminal according to an embodiment of the present invention;

DETAILED DESCRIPTION OF ILLUSTRATIVE EMBODIMENTS

To make the objectives, technical solutions, and advantages of embodiments of the present invention clearer, the following clearly and completely describes the technical solutions in embodiments of the present invention with reference to the accompanying drawings in embodiments of the present invention. It is clear that the described embodiments are a part but not all of embodiments of the present invention. All other embodiments obtained by a person of ordinary skill in the art based on embodiments of the present invention without creative efforts shall fall within the protection scope of the present invention.

An embodiment of the present invention provides a display control method. The display control method is applied to a terminal having a foldable display screen. With reference to FIG. 1A and FIG. 1B, the terminal includes a first display screen S1 and a second display screen S2. When the terminal is in an unfolded state, a light emitting direction of the first display screen S1 is opposite to a light emitting direction of the second display screen S2. The second display screen S2 is a foldable screen, and the second display screen S2 is divided into a first display sub-screen S2a and a second display sub-screen S2b based on a folding line Li.

Folding Performance of the Terminal

The terminal is classified into a type-A terminal, a type-B terminal, or a type-C terminal based on folding performance of the foldable screen (the second display screen S2).

Type-A Terminal

Figure 1C:
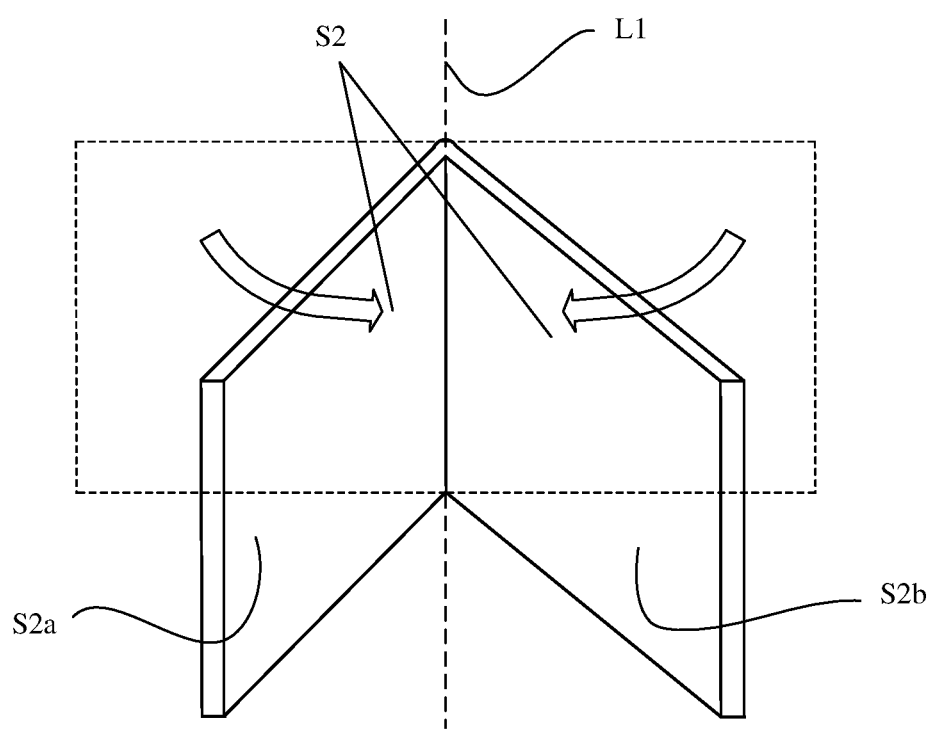
FIG. 1C is a schematic diagram of a side of a second display screen in a process of bending a terminal inwards according to an embodiment of the present invention.

Folding performance of the type-A terminal is that the foldable screen (the second display screen S2) can only be bent inwards. Specifically, as shown in FIG. 1C, when the second display screen S2 of the terminal is bent inwards from an unfolded state (as shown in a dashed box in FIG. 1C) based on the folding line Li (in arrow directions). After the type-A terminal is bent inwards, the type-A terminal is in a fully folded state shown in FIG. 1E, and the first display sub-screen S2a and the second display sub-screen S2b of the second display screen S2 are covered on the inner side of the terminal. In the fully folded state, a display screen visible to a user on the outer side of the terminal is only the first display screen S1.

Type-B Terminal

Figure 1D:
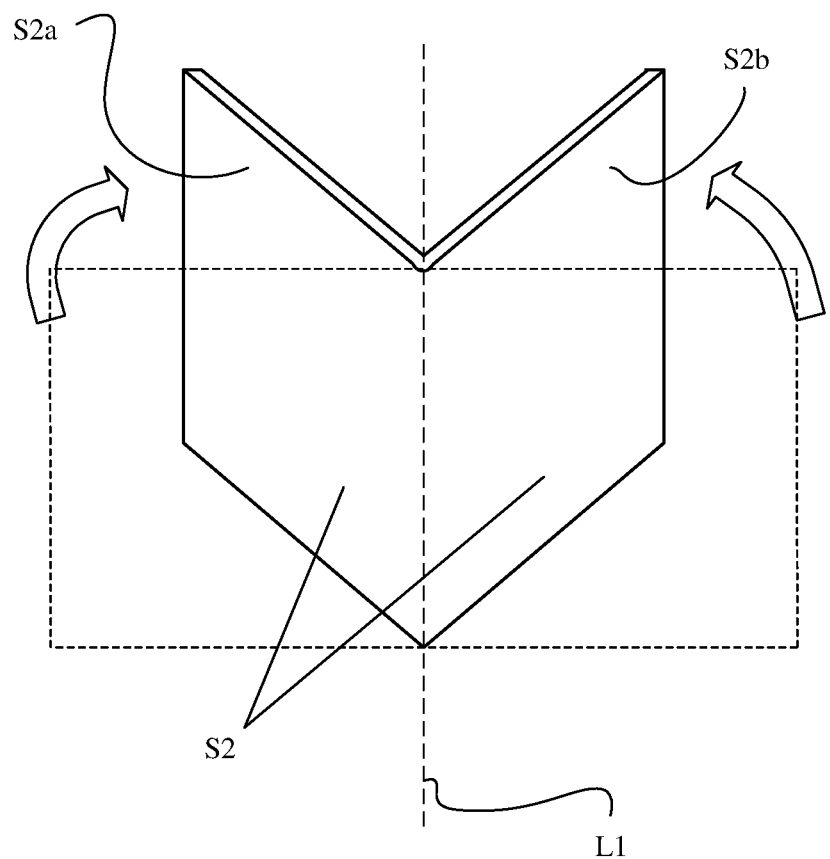
FIG. 1D is a schematic diagram of a side of a second display screen in a process of bending a terminal outwards according to an embodiment of the present invention.

Folding performance of the type-B terminal is that the foldable screen (the second display screen S2) can only be bent outwards. Specifically, as shown in FIG. 1D, when the second display screen S2 of the terminal is bent outwards from an unfolded state (as shown in a dashed box in FIG. 1D) based on the folding line Li (in arrow directions). After the type-B terminal is bent outwards, the type-B terminal is in a fully folded state shown in FIG. 1F, and the first display screen S1 is covered on the inner side of the terminal. In the fully folded state, display screens visible to a user on the outer side of the terminal are only the first display sub-screen S2a and the second display sub-screen S2b on two sides of the terminal.

Type-C Terminal

Folding performance of the type-C terminal is that (the second display screen S2) cannot only be bent outwards but also be bent inwards, that is, bidirectional folding is supported.

Because the type-C terminal has both folding performance of the foldable screen of the type-A terminal and folding performance of the foldable screen of the type-B terminal, the display control method in this embodiment may be applied to the type-C terminal, and may also be applied to the type-A terminal and the type-B terminal. Therefore, an example in which the display control method provided in this embodiment of the present invention is applied to the type-C terminal is used for description in the following.

Figure 1E:
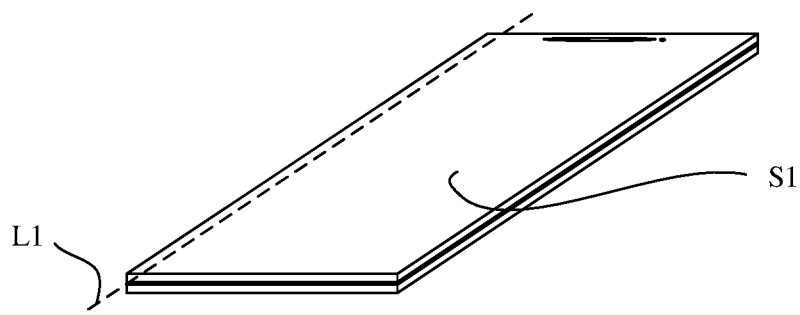
FIG. 1E is a schematic diagram of a side of a first display screen after inward bending and folding are completed according to an embodiment of the present invention.
Figure 1F:
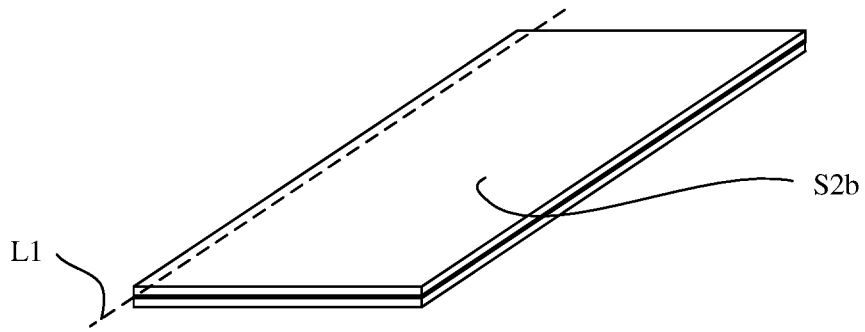
FIG. 1F is a schematic diagram of a side of a second display sub-screen after outward bending and folding are completed according to an embodiment of the present invention.
Figure 2:
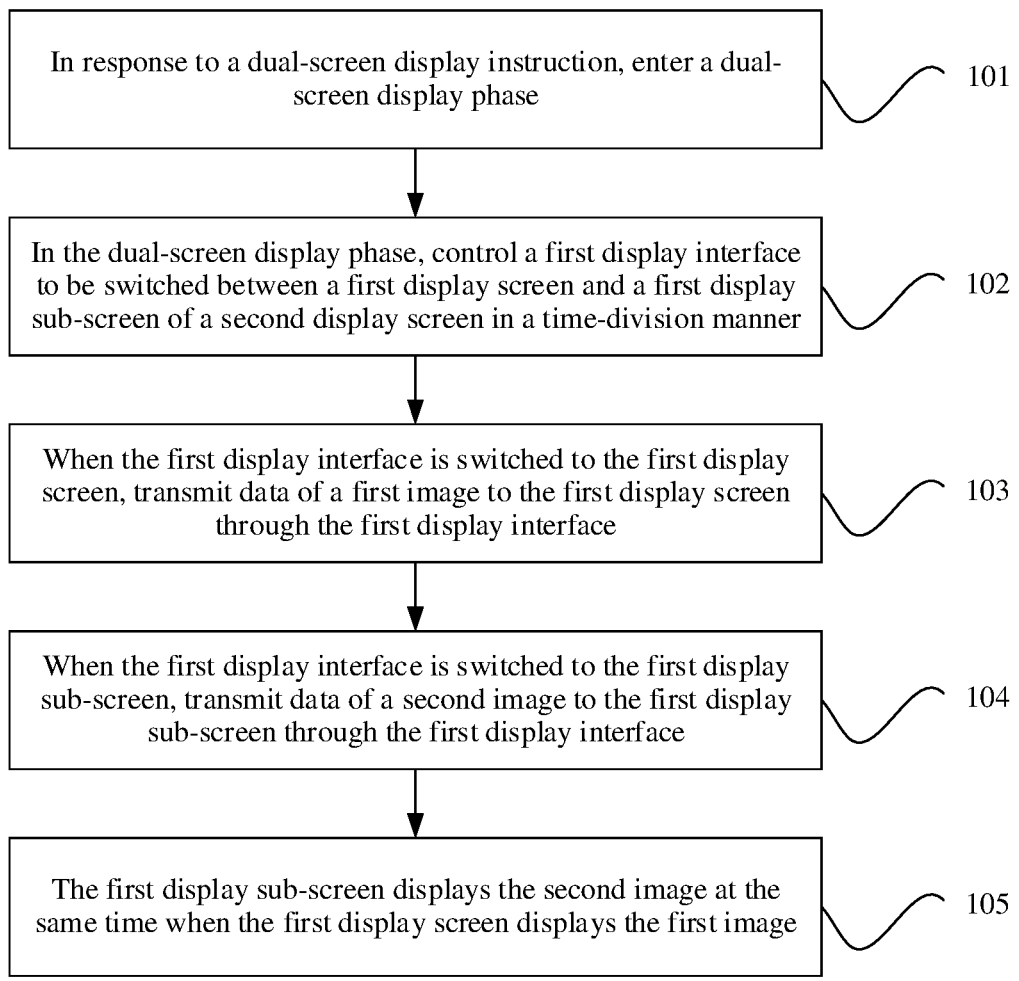
FIG. 2 is a schematic flowchart of a display control method according to an embodiment of the present invention.

FIG. 2 is a schematic flowchart of a display control method according to an embodiment of the present invention. As shown in FIG. 1, the display control method includes the following steps.

Step 101: In response to a dual-screen display instruction, enter a dual-screen display phase.

Step 102: In the dual-screen display phase, control a first display interface to be switched between a first display screen and a first display sub-screen of a second display screen in a time-division manner.

Step 103: When the first display interface is switched to the first display screen, transmit data of a first image to the first display screen through the first display interface.

Step 104: When the first display interface is switched to the first display sub-screen, transmit data of a second image to the first display sub-screen through the first display interface.

Step 105: The first display sub-screen displays the second image at the same time when the first display screen displays the first image.

About Step 101

When a terminal enters a specified scenario, the terminal needs to control simultaneous display of a first display screen and a second display screen in the specified scenario. The specified scenario may be one of the following scenarios: a power-on scenario, an active power-off scenario, a low-battery power-off scenario, a power-off charging scenario, and a system recovery scenario. When it is determined that the terminal enters the specified scenario, an instruction for entering a corresponding scenario may be used as a dual-screen display instruction, and a dual-screen display phase is entered in response to the dual-screen display instruction.

Figure 3A:
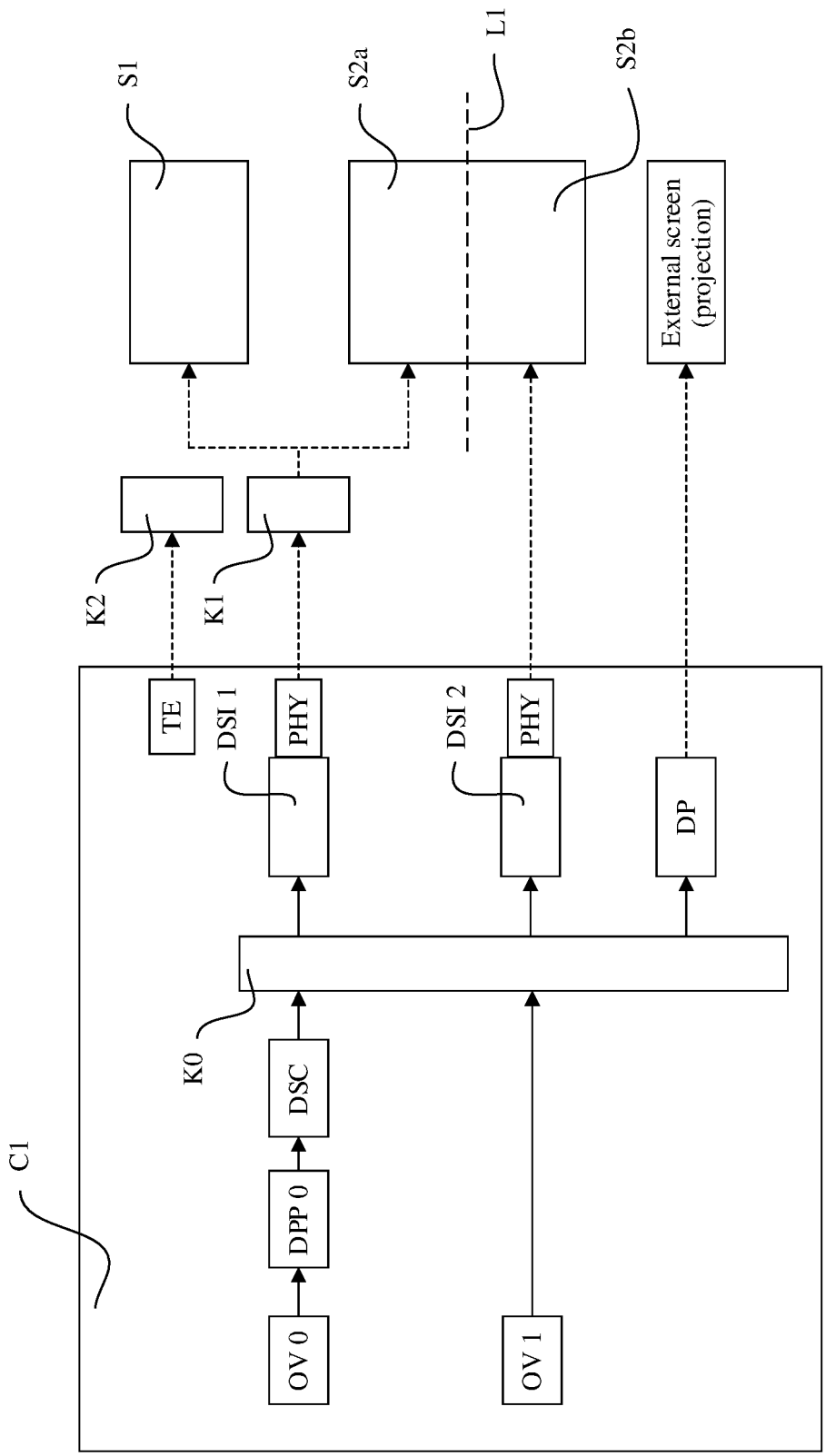
FIG. 3A is a schematic diagram of dual-screen simultaneous display processing according to an embodiment of the present invention.

FIG. 3A is a schematic diagram of dual-screen simultaneous display processing according to an embodiment of the present invention. Overlays (OVs, overlays) in a chip C1 include an OV 0 and an OV 1. The OV 0 and the OV 1 are responsible for scaling, cropping, and synthesizing data of a plurality of layers, so that the data is finally synthesized into one frame of data. A display post processor (DPP, Display Post Processor) DPP 0 is configured to perform post-processing on an effect, a color, and the like of synthesized display data. Display stream compression DSC (Display Stream Compression) is mainly used for compressing a display data stream. A pipe switch (Pipe switch) K0 is mainly responsible for matching and selecting a channel between an overlay and a display serial interface (Display Serial Interface, DSI). For example, the OV 0 is connected to a DSI 0 or a DSI 1 through the pipe switch.

Figure 3B:
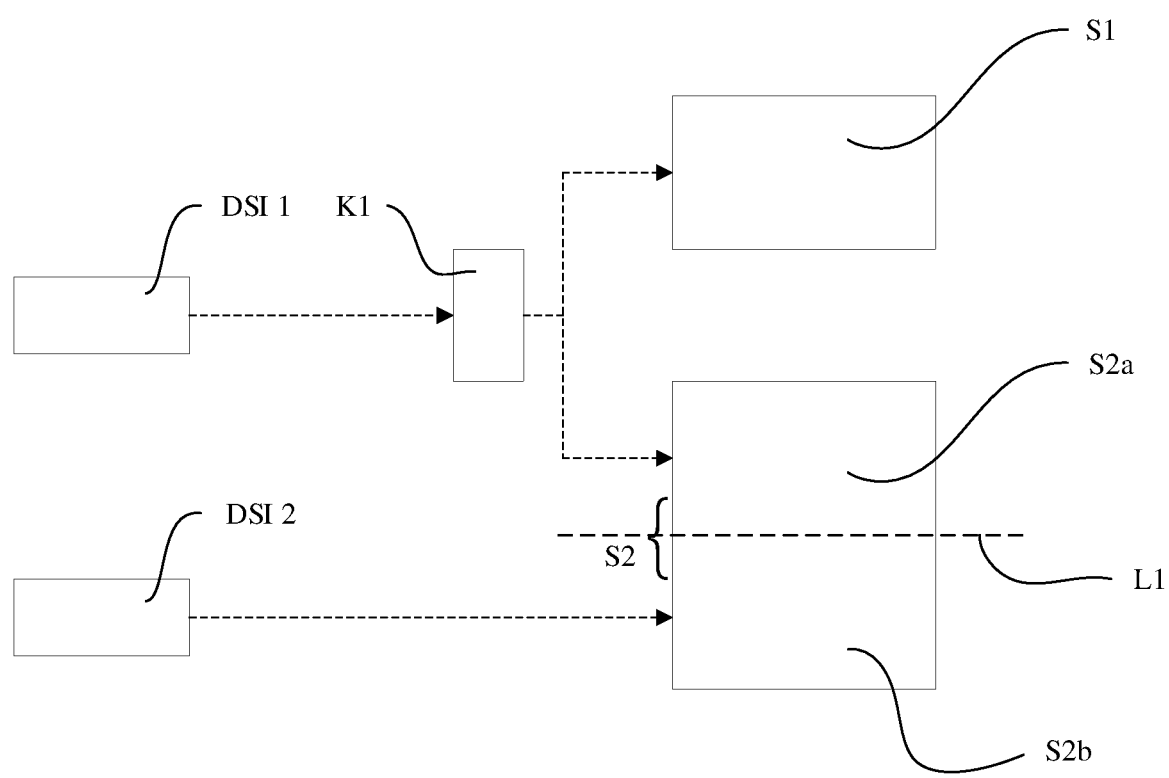
FIG. 3B is a schematic diagram of display interface switching according to an embodiment of the present invention.

FIG. 3B is a schematic diagram of display interface switching according to an embodiment of the present invention. As shown in FIG. 3B, the terminal includes a first display interface DSI 1 and a second display interface DSI 2, that is, supports two DSI display channels. The display interface in this embodiment of this application may be a display serial interface (Display Serial Interface, DSI). When the first display screen S1 independently performs displaying, either of the first display interface DSI 1 and the second display interface DSI 2 may be connected to the first display screen S1, to transmit display data to the first display screen S1. For example, in the manner shown in FIG. 3B, the first display interface DSI 1 is connected to the first display screen S1, to transmit the display data to the first display screen S1 When the second display screen S2 independently performs displaying, the first display interface DSI 1 and the second display interface DSI 2 are respectively connected to the first display sub-screen S2a and the second display sub-screen S2b of the second display screen S2, to respectively transmit corresponding display data to the first display sub-screen S2a and the second display sub-screen S2b through the first display interface DSI 1 and the second display interface DSI 2.

About Steps 102 to 105

In response to the dual-screen display instruction, in the dual-screen display phase, the first display interface DSI 1 is controlled to be switched between the first display screen S1 and the first display sub-screen S2a of the second display screen S2 in a time-division manner. Specifically, the first display interface DSI 1 is connected to the first display screen S1 and the first display sub-screen S2a of the second display screen S2 through a switching switch (SWITCH) K1 in a time-division manner. When the first display interface DSI 1 is switched to the first display screen S1, the data of the first image is transmitted to the first display screen S1 through the first display interface DSI 1, or when the first display interface DSI 1 is switched to the first display sub-screen S2a, the data of the second image is transmitted to the first display sub-screen S2a through the first display interface DSI 1, so that the first display sub-screen S2a displays the second image at the same time when the first display screen S1 displays the first image.

In an embodiment, the dual-screen display phase includes the following steps.

Step S1 Generate a primary screen image and a secondary screen image.

Step S2A: Determine a current bending status of the second display screen, determine a primary screen and a secondary screen based on the current bending status of the second display screen, display the primary screen image on the primary screen, and display the secondary screen image on the secondary screen.

About Step S1

Before dual-screen display, at least a part of the corresponding primary screen image and at least a part of the corresponding secondary screen image, for example, a static logo, may be generated in advance based on a dual-screen display scenario type, and data of the generated at least a part of the primary screen image and data of the generated at least a part of the secondary screen image are respectively stored in a first buffer and a second buffer. Subsequently, the complete primary screen image may be generated based on the data of the at least a part of the primary screen image in the first buffer, and the complete secondary screen image may be generated based on the data of the at least a part of the secondary screen image in the second buffer. Based on a display requirement, the display interface (the first display interface DSI 1 and/or the second display interface DSI 2) may alternatively be used for transmitting a display image drawn in real time to the primary screen and/or the secondary screen.

About Step S2A

A current status of the second display screen is determined. The current bending status (a folded state or an unfolded state) of the second display screen S2 of the terminal may be determined based on a parameter of an internal sensor of the terminal, and the primary screen and the secondary screen are determined based on the current bending status of the second display screen S2. For example, an included angle of the first display sub-screen S2a relative to the second display sub-screen S2b may be determined based on the internal sensor of the terminal, and then a folded status of the second display screen is determined based on the included angle. Further, in the first display screen S1 and the second display screen S2, which one is the primary screen and which one is the secondary screen are determined based on a current status of the terminal. When the primary screen and the secondary screen are determined, the first display interface DSI 1 is controlled to be switched between the first display screen S1 and the first display sub-screen S2a of the second display screen S2 in a time-division manner. When the first display interface DSI 1 is switched to the first display screen S1, the data of the first image is transmitted to the first display screen S1 through the first display interface DSI 1, or when the first display interface DSI 1 is switched to the first display sub-screen S2a, the data of the second image is transmitted to the first display sub-screen S2a through the first display interface DSI 1, so that the first display sub-screen S2a displays the second image at the same time when the first display screen S1 displays the first image.

In the dual-screen display phase, whether to control the second display interface DSI 2 to be connected to the second display sub-screen S2b to transmit a third image to the second display sub-screen S2b may be determined based on a current status and a display requirement of the second display screen S2 of the terminal, so that the second display sub-screen S2b, the first display screen S1, and the first display sub-screen S2a simultaneously perform displaying.

In another embodiment, the dual-screen display phase includes the following steps.

Step S1 Generate a primary screen image and a secondary screen image.

Step S2B: Determine a current bending status of the second display screen and an orientation of the terminal, determine a primary screen and a secondary screen based on the current bending status of the second display screen and the orientation of the terminal, display the primary screen image on the primary screen, and display the secondary screen image on the secondary screen.

About Step S1

Before dual-screen display, at least a part of the corresponding primary screen image and at least a part of the corresponding secondary screen image, for example, a static logo, may be generated in advance based on a dual-screen display scenario type, and data of the generated at least a part of the primary screen image and data of the generated at least a part of the secondary screen image are respectively stored in a first buffer and a second buffer. Subsequently, the complete primary screen image may be generated based on the data of the at least a part of the primary screen image in the first buffer, and the complete secondary screen image may be generated based on the data of the at least a part of the secondary screen image in the second buffer. Based on a display requirement, the display interface (the first display interface DSI 1 and/or the second display interface DSI 2) may alternatively be used for transmitting a display image drawn in real time to the primary screen and/or the secondary screen.

About Step S2B

A current status of the second display screen is determined. The current bending status (a folded state or an unfolded state) of the second display screen S2 of the terminal and the orientation of the terminal may be determined based on a parameter of an internal sensor of the terminal, and the primary screen and the secondary screen are determined based on the current bending status of the second display screen S2 and the orientation of the terminal. For example, an included angle of the first display sub-screen S2a relative to the second display sub-screen S2b may be determined based on the internal sensor of the terminal, and then a folded status of the second display screen is determined based on the included angle. Further, a posture of holding the terminal by a user is determined based on the parameter of the internal sensor of the terminal, and then the orientation of the terminal (which display screen faces the user) is determined based on the holding posture. Further, in the first display screen S1 and the second display screen S2, which one is the primary screen and which one is the secondary screen are determined based on a current status and the orientation of the terminal. When the primary screen and the secondary screen are determined, the first display interface DSI 1 is controlled to be switched between the first display screen S1 and the first display sub-screen S2a of the second display screen S2 in a time-division manner. When the first display interface DSI 1 is switched to the first display screen S1, the data of the first image is transmitted to the first display screen S1 through the first display interface DSI 1, or when the first display interface DSI 1 is switched to the first display sub-screen S2a, the data of the second image is transmitted to the first display sub-screen S2a through the first display interface DSI 1, so that the first display sub-screen S2a displays the second image at the same time when the first display screen S1 displays the first image.

In the dual-screen display phase, whether to control the second display interface DSI 2 to be connected to the second display sub-screen S2b to transmit a third image to the second display sub-screen S2b may be determined based on a current status and a display requirement of the second display screen S2 of the terminal, so that the second display sub-screen S2b, the first display screen S1, and the first display sub-screen S2a simultaneously perform displaying.

In a conventional technology, an SOC chip of a terminal supports only two DSI display channels. If the conventional technology is used for dual-screen display, a first display screen S1 independently occupies one DSI display channel, and a second display screen S2 (a foldable screen) occupies the other DSI display channel. In a dual-screen display phase of the terminal (the first display screen S1 and the second display screen S2 simultaneously perform displaying), display resolution of the foldable screen on a single DSI display channel is limited by screen charging time and a process, and therefore, a drive capability is limited, and the resolution is not too high. To avoid the foregoing problem, according to the foregoing technical solution, in the dual-screen display phase, the first display interface of the terminal having a foldable display screen is controlled to be switched between the first display screen and the first display sub-screen of the second display screen in a time-division manner. In this way, when the first display interface is switched to the first display screen, the data of the first image is transmitted to the first display screen through the first display interface, or when the first display interface is switched to the first display sub-screen, the data of the second image is transmitted to the first display sub-screen through the first display interface, so that the first display sub-screen displays the second image at the same time when the first display screen displays the first image. Therefore, according to the foregoing solution, time division multiplexing may be performed on a display interface when a processing capability of a terminal chip is not changed. This ensures that simultaneous display of dual display screens (the first display screen and the first display sub-screen of the second display screen) can be implemented in the dual-screen display phase without sacrificing resolution of the display screens.

The foregoing cases are described in detail by using the following several embodiments.

Further, embodiments of the present invention are distinguished based on different manners for determining a primary screen/a secondary screen. It can be learned based on the foregoing description of the dual-screen display phase that, embodiments of the present invention provide two manners for determining the primary screen/the secondary screen, to be specific, determining the primary screen/the secondary screen based on only a current bending status of a second display screen, or determining the primary screen/the secondary screen based on a current bending status of a second display screen and an orientation of a terminal. Therefore, Embodiment 1 and Embodiment 2 are provided below. In Embodiment 1, a primary screen/a secondary screen is determined based on only a current status of a second display screen, and a dual-screen display control operation is performed after the primary screen/the secondary screen is determined. In Embodiment 2, a primary screen/a secondary screen is determined based on a current status of a second display screen and an orientation of a terminal, and a dual-screen display control operation is performed after the primary screen/the secondary screen is determined.

Embodiment 1

Figure 4A:
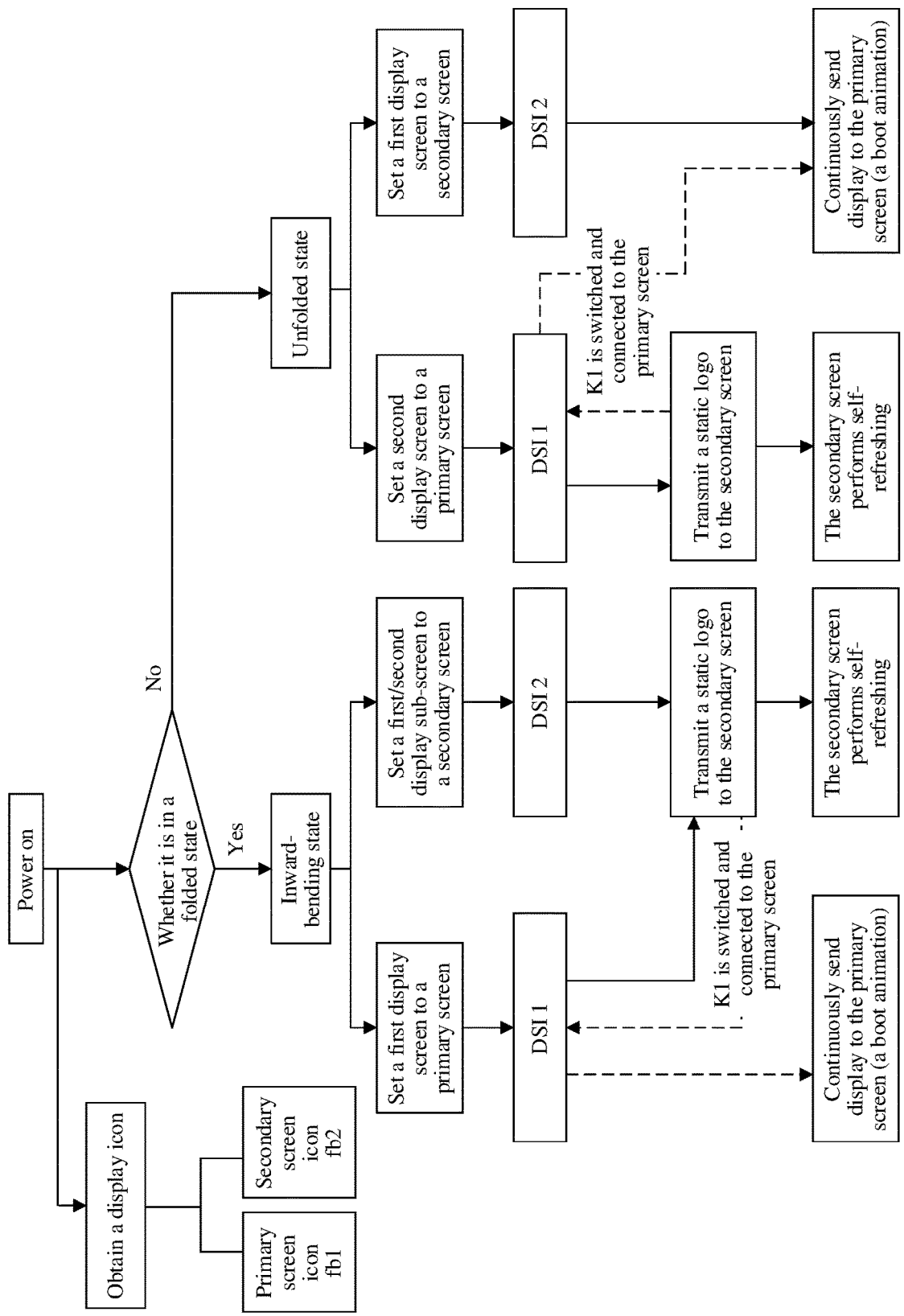
FIG. 4A is a schematic flowchart of dual-screen display in a power-on scenario according to an embodiment of the present invention.
Figure 4B:
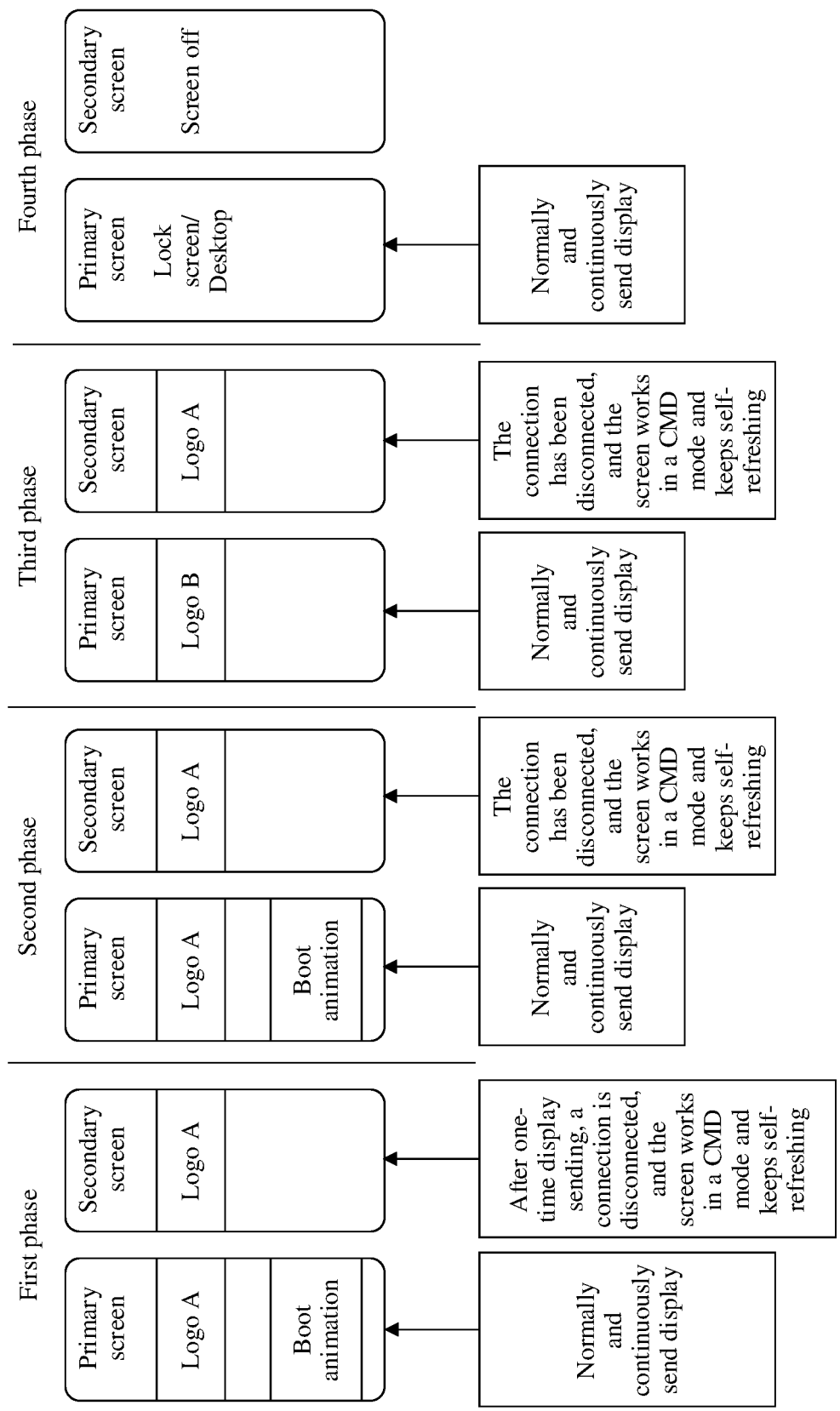
FIG. 4B is a schematic diagram of display specifications in each phase in a power-on scenario according to an embodiment of the present invention.

FIG. 4A is a schematic flowchart of dual-screen display in a power-on scenario according to an embodiment of the present invention. FIG. 4B is a schematic diagram of display specifications in each phase in a power-on scenario according to an embodiment of the present invention. With reference to FIG. 4A and FIG. 4B, in a power-on scenario of a terminal, before dual-screen display, at least a part of a primary screen image and at least a part of a secondary screen image, for example, a static logo, may be generated in advance, and data of the at least a part of the primary screen image and data of the at least a part of the secondary screen image are respectively buffered in a first buffer and a second buffer.

A current bending status of the terminal, that is, a folded status (a bending status) of a second display screen S2, is determined based on an internal sensor of the terminal, and a primary screen/a secondary screen after the terminal is powered on this time is determined based on a status of the terminal at a power-on moment.

If it is detected that the second display screen S2 is bent inwards and is in the fully folded state shown in FIG. 1E (the second display screen S2 is covered on the inner side of the terminal, and only a first display screen S1 is visible to a user), the first display screen S1 is set to the primary screen, and a first display sub-screen S2a and a second display sub-screen S2b are set to secondary screens.

A first display interface DSI 1 is connected to the first display screen S1 and the first display sub-screen S2a of the second display screen S2 through a switching switch (SWITCH) K1 in a time-division manner. When the first display interface DSI 1 is switched to the first display screen S1, data of a first image (the primary screen image) is transmitted to the first display screen S1 through the first display interface DSI 1, or when the first display interface DSI 1 is switched to the first display sub-screen S2a, data of a second image (the secondary screen image) is transmitted to the first display sub-screen S2a through the first display interface DSI 1, and data of a third image (the secondary screen image) is transmitted to the second display sub-screen S2b through a second display interface, so that the first display sub-screen S2a and the second display sub-screen S2b display the secondary screen image at the same time when the first display screen S1 displays the primary screen image.

Specifically, the primary screen image may be obtained from the first buffer, where the primary screen image may include the static logo and a plurality of customized logos; and the secondary screen image may be obtained from the second buffer, where the secondary screen image is the static logo. When a display subsystem determines the primary screen/the secondary screen, before display sending, the display subsystem may first control display control modules and display screen modules of the secondary screens (the first display sub-screen S2a and the second display sub-screen S2b) to be powered on and initialized; control the switching switch K1 to be switched to the first display sub-screen S2a, so that the first display interface DSI 1 is connected to the first display sub-screen S2a; and transmit the static logo to the first display sub-screen S2a, and transmit the static logo to the second display sub-screen S2b through the second display interface DSI 2, to complete one-time display sending, so that the first display sub-screen S2a and the second display sub-screen S2b separately display the static logo.

After it is ensured that the secondary screen displays the static logo, no new display image is transmitted to the secondary screen. The secondary screen keeps displaying the static logo in a self-refresh mode of the secondary screen before a power-on program ends. After it is ensured that the secondary screen starts to display the static logo, the switching switch K1 is controlled to be switched to the first display screen S1, so that the first display interface DSI 1 is connected to the first display screen S1 The static logo and the plurality of customized logos are transmitted to the first display screen. The first display interface DSI 1 is controlled to continuously send display to the first display screen S1, so that the first display screen S1 continuously refreshes an image based on data transmitted through the first display interface DSI 1.

Specifically, with reference to FIG. 4A and FIG. 4B, the power-on program of the terminal may be divided into four phases. In a first phase (Fastboot), the first display interface DSI 1 sends the static logo to the secondary screen, and after one-time display sending is completed, the first display interface DSI 1 is disconnected from the first display sub-screen S2a; and the second display interface DSI 2 sends the static logo to the secondary screen, and after one-time display sending is completed, the second display interface DSI 2 stops transmitting display data to the second display sub-screen S2b. In a CMD mode, the secondary screen keeps self-refresh displaying. That is, the secondary screen keeps displaying the static logo before the power-on program ends. The switching switch K1 is controlled to be switched to the primary screen, and display is continuously sent to the primary screen. The primary screen continuously refreshes an image based on transmitted data. In the first phase, the secondary screen displays only the static logo (for example, a logo A), and starts self-refreshing to keep displaying the logo A. The primary screen may display other content (for example, a boot animation) in another region of the screen at the same time when displaying the logo A in a region.

In a second phase (Kernel), the first display interface DSI 1 keeps disconnected from the first display sub-screen S2a, the second display interface DSI 2 keeps stopping transmitting the display data to the second display sub-screen S2b, and the secondary screen keeps self-refreshing. The switching switch K1 is controlled to keep connected to the primary screen, the first display interface DSI 1 continuously sends display to the primary screen, and the primary screen continuously refreshes an image based on transmitted data. In the second phase, the secondary screen displays the static logo (for example, the logo A) in a self-refresh mode. The primary screen may display other content (for example, continue to display the boot animation) in another region of the screen at the same time when displaying the logo A in a region.

In a third phase (BootAnimation), the first display interface DSI 1 keeps disconnected from the first display sub-screen S2a, the second display interface DSI 2 keeps stopping transmitting the display data to the second display sub-screen S2b, and the secondary screen keeps self-refreshing. The switching switch K1 is controlled to keep connected to the primary screen, the first display interface DSI 1 continuously sends display to the primary screen (transmits another customized logo in this case), and the primary screen continuously refreshes an image based on transmitted data. In the third phase, the primary screen displays a logo B, and the secondary screen continues to display the logo A in a self-refresh mode.

In a fourth phase (Android), the first display interface DSI 1 keeps disconnected from the first display sub-screen S2a, the second display interface DSI 2 keeps stopping transmitting the display data to the second display sub-screen S2b, and the secondary screen is turned off. The switching switch K1 is controlled to keep connected to the primary screen, the first display interface DSI 1 continuously sends display to the primary screen (transmits desktop UI data), and the primary screen continuously refreshes an image based on transmitted data.

After the power-on program is completed, a current bending status of the terminal, that is, a folded status (a bending status) of the second display screen S2, is re-determined, and the primary screen and the secondary screen are reset based on the folded status of the second display screen S2.

In this embodiment, the first display interface DSI 1 and the second display interface DSI 2 respectively transmit the second image and the third image to the first display sub-screen S2a and the second display sub-screen S2b, where the second image and the third image may be respectively a part of the secondary screen image and the other part of the secondary screen image, so that the second display screen S2 formed by the first display sub-screen S2a and the second display sub-screen S2b displays the complete secondary screen image.

When the second display screen is in an unfolded state

With reference to FIG. 4A and FIG. 4B, in a power-on scenario of the terminal, before dual-screen display, at least a part of a primary screen image and at least a part of a secondary screen image, for example, a static logo, may be generated in advance, and data of the at least a part of the primary screen image and data of the at least a part of the secondary screen image are respectively buffered in the first buffer and the second buffer.

A current bending status of the terminal, that is, a folded status (a bending status) of the second display screen S2, is determined based on the internal sensor of the terminal, and a primary screen/a secondary screen after the terminal is powered on this time is determined based on a status of the terminal at a power-on moment.

If it is detected that the second display screen S2 is in the unfolded state shown in FIG. 1B, the second display screen S2 is set to the primary screen, and the first display screen S1 is set to the secondary screen.

The first display interface DSI 1 is connected to the first display screen S1 and the first display sub-screen S2a of the second display screen S2 through the switching switch (SWITCH) K1 in a time-division manner. When the first display interface DSI 1 is switched to the first display screen S1, data of a first image (the secondary screen image) is transmitted to the first display screen S1 through the first display interface DSI 1, or when the first display interface DSI 1 is switched to the first display sub-screen S2a, data of a part of the primary screen image is transmitted to the first display sub-screen S2a through the first display interface DSI 1, and data of a third image (the other part of the primary screen image) is transmitted to the second display sub-screen S2b through the second display interface DSI 2, so that the second display screen S2 formed by the first display sub-screen S2a and the second display sub-screen S2b displays the complete primary screen image at the same time when the first display screen S1 displays the secondary screen image.

Specifically, the primary screen image may be obtained from the first buffer, where the primary screen image may include the static logo and a plurality of customized logos; and the secondary screen image may be obtained from the second buffer, where the secondary screen image is the static logo. When the display subsystem determines the primary screen/the secondary screen, before display sending, the display subsystem may first control a display control module and a display screen module of the secondary screen (the first display screen S1) to be powered on and initialized; control the switching switch K1 to be switched to the first display screen S1, so that the first display interface DSI 1 is connected to the first display screen S1 and transmit the static logo to the first display screen S1.

After it is ensured that the secondary screen displays the static logo, the display subsystem transmits no new display image to the secondary screen. The secondary screen keeps displaying the static logo in a self-refresh mode of the secondary screen before a power-on program ends. After it is ensured that the secondary screen starts to display the static logo, the display subsystem controls the switching switch K1 to be switched to the first display sub-screen S2a, so that the first display interface DSI 1 is connected to the first display sub-screen S2a; transmits a part of the static logo and a part of the plurality of customized logos to the first display sub-screen S2a; transmits the other part of the static logo and the other part of the plurality of customized logos to the second display sub-screen S2b through the second display interface DSI 2; and controls the first display interface DSI 1 to continuously send display to the first display sub-screen S2a, and controls the second display interface DSI 2 to continuously send display to the second display sub-screen S2b, so that the second display screen S2 formed by the first display sub-screen S2a and the second display sub-screen S2b displays the complete static logo and the complete plurality of customized logos.

Specifically, as shown in FIG. 4B, the power-on program of the terminal may be divided into four phases. In a first phase (Fastboot), the first display interface DSI 1 sends the static logo to the secondary screen. After one-time display sending is completed, the first display interface DSI 1 is disconnected from the first display screen S1 That is, the secondary screen keeps displaying the static logo before the power-on program ends. The switching switch K1 is controlled to be switched to the primary screen. The first display interface DSI 1 is connected to the first display sub-screen S2a, and the second display interface DSI 2 is connected to the second display sub-screen S2b. Display is continuously sent to the primary screen. The primary screen continuously refreshes an image based on transmitted data. In the first phase, the secondary screen displays only the static logo (for example, a logo A), and starts self-refreshing to keep displaying the logo A. The primary screen may display other content (for example, a boot animation) in another region of the screen at the same time when displaying the logo A in a region.

In a second phase (Kernel), the first display interface DSI 1 keeps disconnected from the first display screen S1, and the secondary screen keeps self-refreshing. The first display interface DSI 1 is connected to the first display sub-screen S2a, and the second display interface DSI 2 is connected to the second display sub-screen S2b. Display is continuously sent to the primary screen. The primary screen continuously refreshes an image based on transmitted data. In the second phase, the secondary screen displays the static logo (for example, the logo A) in a self-refresh mode. The primary screen may display other content (for example, continue to display the boot animation) in another region of the screen at the same time when displaying the logo A in a region.

In a third phase (BootAnimation), the first display interface DSI 1 keeps disconnected from the first display screen S1, and the secondary screen keeps self-refreshing. The first display interface DSI 1 is connected to the first display sub-screen S2a, and the second display interface DSI 2 is connected to the second display sub-screen S2b. Display is continuously sent to the primary screen (another customized logo is transmitted in this case). The primary screen continuously refreshes an image based on transmitted data. In the third phase, the primary screen displays a logo B, and the secondary screen continues to display the logo A in a self-refresh mode.

In a fourth phase (Android), the first display interface DSI 1 keeps disconnected from the first display screen S1, and the secondary screen is turned off. The first display interface DSI 1 is connected to the first display sub-screen S2a, and the second display interface DSI 2 is connected to the second display sub-screen S2b. Display is continuously sent to the primary screen (desktop UI data is transmitted). The primary screen continuously refreshes an image based on transmitted data.

After the power-on program is completed, a current bending status of the terminal, that is, a folded status (a bending status) of the second display screen S2, is re-determined, and the primary screen and the secondary screen are reset based on the folded status of the second display screen S2.

In Embodiment 1, only the power-on scenario is used as an example. The display control method is also applicable to another scenario. This is not limited herein.

Embodiment 2

Figure 5:
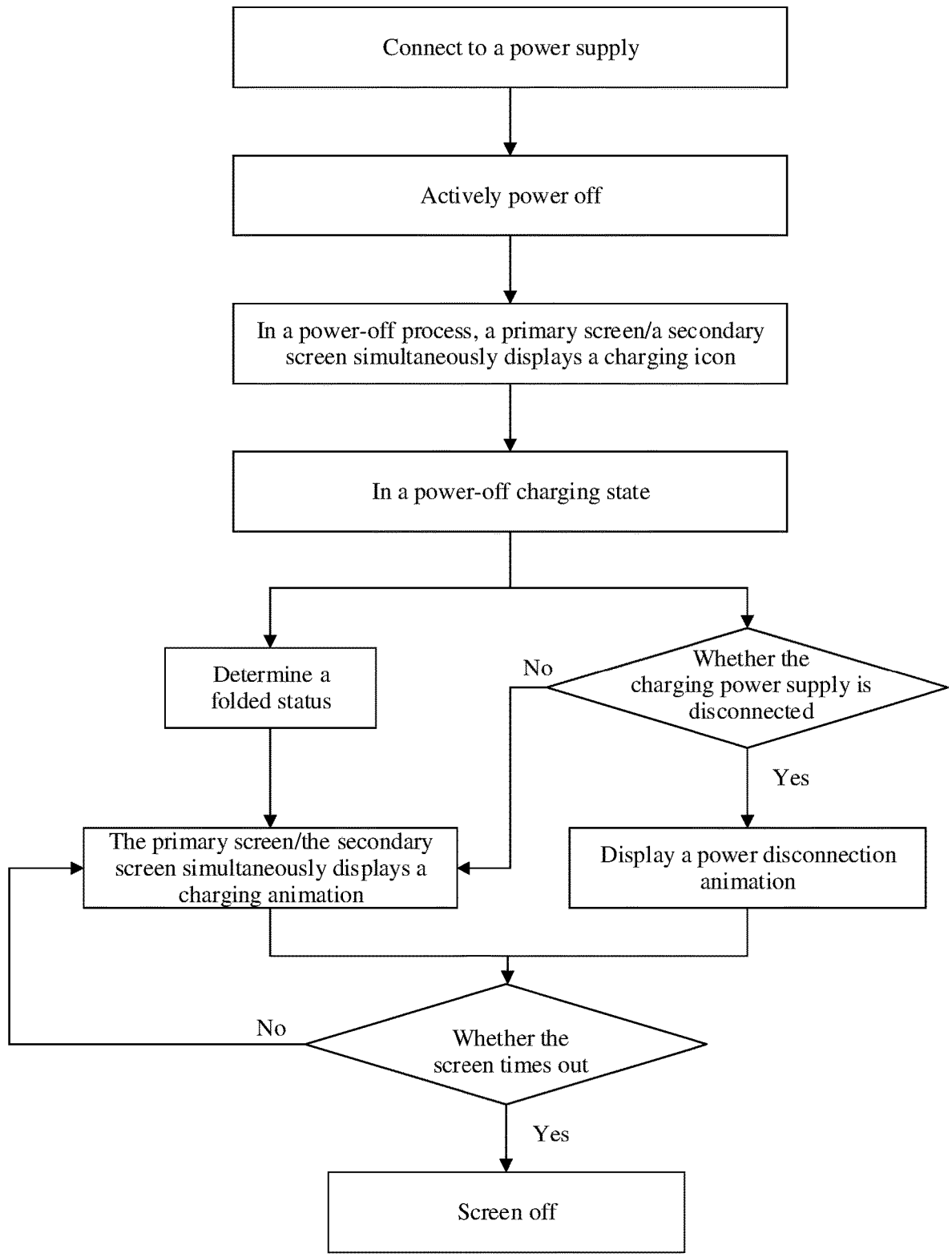
FIG. 5 is a schematic flowchart of dual-screen display in a power-off charging scenario according to an embodiment of the present invention.

FIG. 5 is a schematic flowchart of dual-screen display in a power-off charging scenario according to an embodiment of the present invention. As shown in FIG. 5, in a scenario in which a user of a terminal connected to a power supply actively powers off the terminal for charging, before dual-screen display, at least a part of a primary screen image and at least a part of a secondary screen image, for example, a power connection logo, may be generated in advance, and data of the at least a part of the primary screen image and data of the at least a part of the secondary screen image are respectively buffered in a first buffer and a second buffer.

A current bending status of the terminal, that is, a folded status (a bending status) of a second display screen S2, is determined based on an internal sensor of the terminal, and a primary screen/a secondary screen is set based on a status of the terminal at a moment when the terminal is connected to the power supply.

If it is detected that the second display screen S2 is in an unfolded state and the second display screen S2 faces the user (as shown in FIG. 1B), the second display screen S2 is set to the primary screen, and a first display screen S1 is set to the secondary screen.

A first display interface DSI 1 is connected to the first display screen S1 and a first display sub-screen S2a of the second display screen S2 through a switching switch (SWITCH) K1 in a time-division manner. When the first display interface DSI 1 is switched to the first display screen S1, data of a first image (which is the secondary screen image in this case) is transmitted to the first display screen S1 through the first display interface DSI 1, or when the first display interface DSI 1 is switched to the first display sub-screen S2a, data of a part of the primary screen image is transmitted to the first display sub-screen S2a through the first display interface DSI 1, and data of a third image (which is the other part of the primary screen image in this case) is transmitted to a second display sub-screen S2b through a second display interface, so that the second display screen S2 formed by the first display sub-screen S2a and the second display sub-screen S2b displays the complete primary screen image at the same time when the first display screen S1 displays the secondary screen image.

In a Power-Off Process in a Charging State

Specifically, the primary screen image may be obtained from the first buffer, where the primary screen image may include the power connection logo (for example, a green lightning icon); and the secondary screen image may be obtained from the second buffer, where the secondary screen image is the power connection logo. When a display subsystem determines the primary screen/the secondary screen, before display sending, the display subsystem may first control a display control module and a display screen module of the secondary screen (the first display screen S1) to be powered on and initialized. The display subsystem controls the switching switch K1 to be switched to the first display screen S1, so that the first display interface DSI 1 is connected to the first display screen S1 and transmits the power connection logo to the first display screen S1.

After it is ensured that the secondary screen displays the power connection logo, the display subsystem transmits no new display image to the secondary screen. The secondary screen keeps displaying the power connection logo in a self-refresh mode of the secondary screen before a power-off program ends. After it is ensured that the secondary screen starts to display the power connection logo, the display subsystem controls the switching switch K1 to be switched to the first display sub-screen S2a, so that the first display interface DSI 1 is connected to the first display sub-screen S2a; transmits a part of the power connection logo to the first display sub-screen S2a; and transmits the other part of the power connection logo to the second display sub-screen S2b through the second display interface DSI 2. The display subsystem controls the first display interface DSI 1 to continuously send display to the first display sub-screen S2a, and controls the second display interface DSI 2 to continuously send display to the second display sub-screen S2b, so that the second display screen S2 formed by the first display sub-screen S2a and the second display sub-screen S2b displays the complete power connection logo. A size of the power connection logo displayed on the second display screen S2 is greater than a size of the power connection logo displayed on the first display screen S1.

In a Process of Continuing Charging after Power Off is Completed

If it is detected that the second display screen S2 is in an unfolded state, the second display screen S2 is set to the primary screen, and the first display screen S1 is set to the secondary screen.

The first display interface DSI 1 is connected to the first display screen S1 and the first display sub-screen S2a of the second display screen S2 through the switching switch (SWITCH) K1 in a time-division manner. When the first display interface DSI 1 is switched to the first display screen S1, data of a first image (which is the secondary screen image in this case) is transmitted to the first display screen S1 through the first display interface DSI 1, or when the first display interface DSI 1 is switched to the first display sub-screen S2a, data of a part of the primary screen image is transmitted to the first display sub-screen S2a through the first display interface DSI 1, and data of a third image (which is the other part of the primary screen image in this case) is transmitted to the second display sub-screen S2b through the second display interface DSI 2, so that the second display screen S2 formed by the first display sub-screen S2a and the second display sub-screen S2b displays the complete primary screen image at the same time when the first display screen S1 displays the secondary screen image.

Specifically, the primary screen image may be obtained from the first buffer, where the primary screen image may be a charging animation; and the secondary screen image may be obtained from the second buffer, where the secondary screen image is the charging animation (with a different size). When the primary screen/the secondary screen is determined, before display sending, the display subsystem may first control a display control module and a display screen module of the secondary screen (the first display screen S1) to be powered on and initialized; control the switching switch K1 to be switched to the first display screen S1, so that the first display interface DSI 1 is connected to the first display screen S1 and transmit the charging animation to the first display screen S1.

After it is ensured that the secondary screen displays the charging animation, no new display image is transmitted to the secondary screen. The secondary screen keeps displaying the charging animation in a self-refresh mode of the secondary screen before the power-off program ends. After it is ensured that the secondary screen starts to display the charging animation, the display subsystem controls the switching switch K1 to be switched to the first display sub-screen S2a, so that the first display interface DSI 1 is connected to the first display sub-screen S2a; transmits a part of the charging animation of the primary screen image to the first display sub-screen S2a; transmits the other part of the charging animation of the primary screen image to the second display sub-screen S2b through the second display interface DSI 2; and controls the first display interface DSI 1 to continuously send display to the first display sub-screen S2a, and controls the second display interface DSI 2 to continuously send display to the second display sub-screen S2b, so that the second display screen S2 formed by the first display sub-screen S2a and the second display sub-screen S2b displays the complete charging animation. A size of a dynamic image in the charging animation displayed on the second display screen S2 is greater than a size of a dynamic image displayed on the first display screen S1.

When a power-off animation starts to be displayed, timing is started, and whether display of the screen times out is determined. If no, the power-off animation is continued to be displayed. If yes, the screen is controlled to be turned off.

After the terminal is powered off, the user controls the terminal to be powered on. In this case, a dual-screen display operation in the foregoing power-on scenario is performed.

In a process in which the terminal is powered off and charged, if it is detected that the terminal is disconnected from the power supply, a power disconnection animation is displayed on both the primary screen and the secondary screen through switching in a time-division manner. After the power disconnection animation starts to be displayed, timing is started, and whether display of the screen times out is determined. If no, the power disconnection animation is continued to be displayed. If yes, the screen is controlled to be turned off.

The second display screen S2 is in an unfolded state, and the first display screen S1 faces the user.

As shown in FIG. 5, in a scenario in which the user of the terminal connected to the power supply actively powers off the terminal for charging, before dual-screen display, at least a part of a primary screen image and at least a part of a secondary screen image, for example, a power connection logo, may be generated in advance, and data of the at least a part of the primary screen image and data of the at least a part of the secondary screen image are respectively buffered in the first buffer and the second buffer.

A current bending status of the terminal, that is, a folded status (a bending status) of the second display screen S2, is determined based on the internal sensor of the terminal, and a primary screen/a secondary screen is set based on a status of the terminal at a moment when the terminal is connected to the power supply.

If it is detected that the second display screen S2 is in an unfolded state and the first display screen S1 faces the user (as shown in FIG. 1A), the first display screen S1 is set to the primary screen, and the second display screen S2 is set to the secondary screen.

The first display interface DSI 1 is connected to the first display screen S1 and the first display sub-screen S2a of the second display screen S2 through the switching switch (SWITCH) K1 in a time-division manner. When the first display interface DSI 1 is switched to the first display sub-screen S2a, data of a second image (which is a part of the secondary screen image in this case) is transmitted to the first display sub-screen S2a through the first display interface DSI 1, and data of a third image (which is the other part of the secondary screen image in this case) is transmitted to the second display sub-screen S2b through the second display interface; or when the first display interface DSI 1 is switched to the first display screen S1, data of a first image (which is the primary screen image in this case) is transmitted to the first display screen S1 through the first display interface DSI 1, so that the second display screen S2 formed by the first display sub-screen S2a and the second display sub-screen S2b displays the complete secondary screen image at the same time when the first display screen S1 displays the primary screen image.

In a Power-Off Process in a Charging State

Specifically, the primary screen image may be obtained from the first buffer, where the primary screen image may include the power connection logo (for example, a green lightning icon); and the secondary screen image may be obtained from the second buffer, where the secondary screen image is the power connection logo. When the primary screen/the secondary screens is/are determined, before display sending, display control modules and display screen modules of the secondary screens (the first display sub-screen S2a and the second display sub-screen S2b) may be first controlled to be powered on and initialized; the switching switch K1 may be controlled to be switched to the first display sub-screen S2a, so that the first display interface DSI 1 is connected to the first display sub-screen S2a; a part of the power connection logo may be transmitted to the first display sub-screen S2a; and the second display interface DSI 2 is connected to the second display sub-screen S2b, and the other part of the power connection logo may be transmitted to the second display sub-screen S2b, so that the second display screen S2 formed by the first display sub-screen S2a and the second display sub-screen S2b displays the complete power connection logo.

After it is ensured that the secondary screen displays the power connection logo, no new display image is transmitted to the secondary screen. The secondary screen keeps displaying the power connection logo in a self-refresh mode of the secondary screen before a power-off program ends. After it is ensured that the secondary screen starts to display the power connection logo, the switching switch K1 is controlled to be switched to the first display screen S1, so that the first display interface DSI 1 is connected to the first display screen S1 The power connection logo of the primary screen image is transmitted to the first display screen S1 The first display interface DSI 1 is controlled to continuously send display to the first display screen S1, so that the first display screen displays the power connection logo of the primary screen image at the same time when the second display screen S2 formed by the first display sub-screen S2a and the second display sub-screen S2b displays the complete power connection logo. A size of the power connection logo displayed on the second display screen S2 is greater than a size of the power connection logo displayed on the first display screen S1.

In a Process of Continuing Charging after Power Off is Completed

If it is detected that the second display screen S2 is in an unfolded state, the second display screen S2 is set to the primary screen, and the first display screen S1 is set to the secondary screen.

The first display interface DSI 1 is connected to the first display screen S1 and the first display sub-screen S2a of the second display screen S2 through the switching switch (SWITCH) K1 in a time-division manner. When the first display interface DSI 1 is switched to the first display screen S1, data of a first image (which is the secondary screen image in this case) is transmitted to the first display screen S1 through the first display interface DSI 1, or when the first display interface DSI 1 is switched to the first display sub-screen S2a, data of a part of the primary screen image is transmitted to the first display sub-screen S2a through the first display interface DSI 1, and data of a third image (which is the other part of the primary screen image in this case) is transmitted to the second display sub-screen S2b through the second display interface, so that the second display screen S2 formed by the first display sub-screen S2a and the second display sub-screen S2b displays the complete primary screen image at the same time when the first display screen S1 displays the secondary screen image.

Specifically, the primary screen image may be obtained from the first buffer, where the primary screen image may be a charging animation; and the secondary screen image may be obtained from the second buffer, where the secondary screen image is the charging animation (with a different size). When the primary screen/the secondary screen is determined, before display sending, a display control module and a display screen module of the secondary screen (the first display screen S1) may be first controlled to be powered on and initialized; the switching switch K1 may be controlled to be switched to the first display screen S1, so that the first display interface DSI 1 is connected to the first display screen S1 and the charging animation may be transmitted to the first display screen S1.

After it is ensured that the secondary screen displays the charging animation, no new display image is transmitted to the secondary screen. The secondary screen keeps displaying the charging animation in a self-refresh mode of the secondary screen before the power-off program ends. After it is ensured that the secondary screen starts to display the charging animation, the switching switch K1 is controlled to be switched to the first display sub-screen S2a, so that the first display interface DSI 1 is connected to the first display sub-screen S2a; a part of the charging animation of the primary screen image is transmitted to the first display sub-screen S2a; the other part of the charging animation of the primary screen image is transmitted to the second display sub-screen S2b through the second display interface DSI 2; and the first display interface DSI 1 is controlled to continuously send display to the first display sub-screen S2a, and the second display interface DSI 2 is controlled to continuously send display to the second display sub-screen S2b, so that the second display screen S2 formed by the first display sub-screen S2a and the second display sub-screen S2b displays the complete charging animation. A size of a dynamic image in the charging animation displayed on the second display screen S2 is greater than a size of a dynamic image displayed on the first display screen S1.

When a power-off animation starts to be displayed, timing is started, and whether display of the screen times out is determined. If no, the power-off animation is continued to be displayed. If yes, the screen is controlled to be turned off.

After the terminal is powered off, the user controls the terminal to be powered on. In this case, a dual-screen display operation in the foregoing power-on scenario is performed.

In a process in which the terminal is powered off and charged, if it is detected that the terminal is disconnected from the power supply, a power disconnection animation is displayed on both the primary screen and the secondary screen through switching in a time-division manner. After the power disconnection animation starts to be displayed, timing is started, and whether display of the screen times out is determined. If no, the power disconnection animation is continued to be displayed. If yes, the screen is controlled to be turned off.

The second display screen S2 is in an outward-bending state, and the first display sub-screen S2a faces the user.

Figure 6:
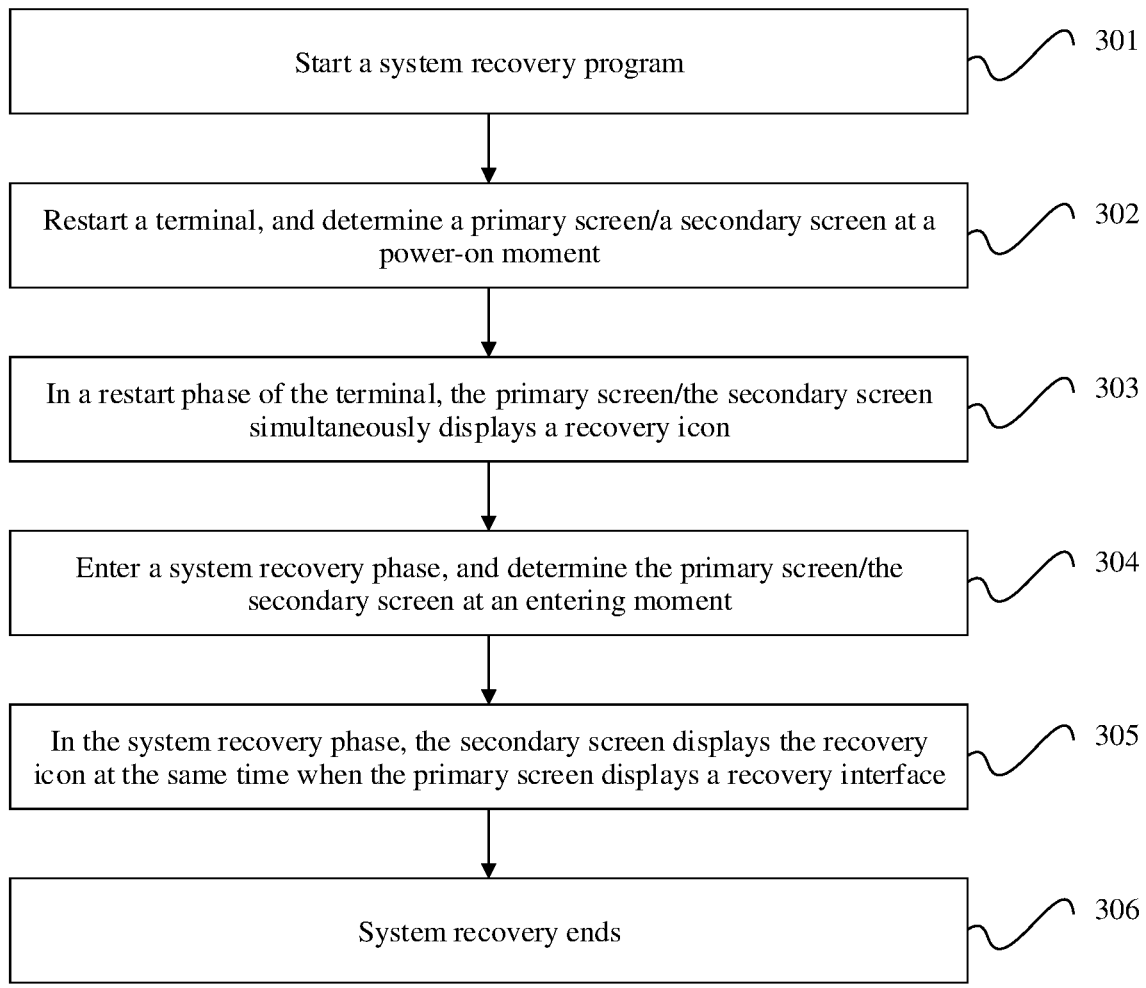
FIG. 6 is a schematic flowchart of dual-screen display in a system recovery scenario according to an embodiment of the present invention.

FIG. 6 is a schematic flowchart of dual-screen display in a system recovery scenario according to an embodiment of the present invention. As shown in FIG. 6, in a system recovery scenario of a terminal, the following steps are performed.

Step 301: Start a system recovery program.

Step 302: Restart the terminal, and determine a primary screen/a secondary screen at a power-on moment.

Step 303: In a restart phase of the terminal, the primary screen/the secondary screen simultaneously displays a recovery icon.

Step 304: Enter a system recovery phase, and determine the primary screen/the secondary screen at an entering moment.

Step 305: In the system recovery phase, the secondary screen displays the recovery icon at the same time when the primary screen displays a recovery interface.

Step 306: System recovery ends.

Steps 301 to 306 are specifically described as follows.

Before dual-screen display, at least a part of a primary screen image and at least a part of a secondary screen image, for example, a static logo, may be generated in advance, and data of the at least a part of the primary screen image and data of the at least a part of the secondary screen image are respectively buffered in a first buffer and a second buffer.

A current bending status of a second display screen S2 of the terminal is determined based on an internal sensor of the terminal. If it is detected that the second display screen S2 is bent outwards and is in a fully folded state (a first display screen S1 is covered on the inner side of the terminal, and a first display sub-screen S2a and a second display sub-screen S2b on two sides of the terminal are visible to a user), and it is detected that the first display sub-screen S2a faces the user (not shown in the figure), the first display sub-screen S2a is set to the primary screen, and the second display sub-screen S2b and the first display screen S1 are set to secondary screens.

A first display interface DSI 1 is connected to the first display screen S1 and the first display sub-screen S2a of the second display screen S2 through a switching switch (SWITCH) K1 in a time-division manner. When the first display interface DSI 1 is switched to the first display screen S1, data of a first image (which is the secondary screen image in this case) is transmitted to the first display screen S1 through the first display interface DSI 1, and data of a third image (which is the secondary screen image in this case) is transmitted to the second display sub-screen S2b through a second display interface; or when the first display interface DSI 1 is switched to the first display sub-screen S2a, data of a second image (which is the primary screen image in this case) is transmitted to the first display sub-screen S2a through the first display interface DSI 1, so that the first display sub-screen S2a displays the primary screen image at the same time when the first display screen S1 and the second display sub-screen S2b display the secondary screen image.

In a Terminal Restart Process for System Recovery

Specifically, the primary screen image may be obtained from the first buffer, where the primary screen image may include a dynamic logo (the recovery icon, for example, a dynamic "wrench" icon); and the secondary screen image may be obtained from the second buffer, where the secondary screen image is a static logo (for example, a static "wrench" icon). When the primary screen/the secondary screens is/are determined, before display sending, display control modules and display screen modules of the secondary screens (the first display screen S1 and the second display sub-screen S2b) may be first controlled to be powered on and initialized. The switching switch K1 may be controlled to be switched to the first display screen S1, so that the first display interface DSI 1 is connected to the first display screen S1 and the static logo may be transmitted to the first display screen S1, and the static logo may be transmitted to the second display sub-screen S2b through the second display interface DSI 2, so that the first display screen S1 and the second display sub-screen S2b separately display the static logo.

After it is ensured that the secondary screen displays the static logo, no new display image is transmitted to the secondary screen. The secondary screen keeps displaying the static logo in a self-refresh mode of the secondary screen before system recovery and restart of the terminal are completed. After it is ensured that the secondary screen starts to display the static logo, the switching switch K1 is controlled to be switched to the first display sub-screen S2a, so that the first display interface DSI 1 is connected to the first display sub-screen S2a. The dynamic logo is transmitted to the first display sub-screen S2a. The first display interface DSI 1 is controlled to continuously send display to the first display sub-screen S2a, so that in a phase of system recovery and restart of the terminal, the first display sub-screen S2a continuously refreshes an image based on data transmitted through the first display interface DSI 1, to implement simultaneous display of the primary screen and the secondary screen in the terminal restart process for system recovery.

After Restart is Completed and a System Recovery Program is Started

After restart is completed and the system recovery program is started, the primary screen and the secondary screen are reset based on a current status of the second display screen S2 and an orientation of the terminal.

The switching switch K1 is controlled to be switched to the first display screen S1, so that the first display interface DSI 1 is connected to the first display screen S1 The static logo is transmitted to the first display screen S1, to complete one-time display sending; and the static logo is transmitted to the second display sub-screen S2b through the second display interface DSI 2, to complete one-time display sending. The secondary screen enters a self-refresh mode based on received data. Before the system recovery program ends, the secondary screen keeps displaying the static logo (the static "wrench") through self-refreshing.

After the first display interface DSI 1 completes one-time display sending to the first display screen S1, the switching switch K1 is controlled to be switched to the first display sub-screen S2a. The first display interface DSI 1 starts to normally send display to the first display sub-screen S2a, that is, transmits a system recovery interface drawn in real time. The first display sub-screen S2a displays the system recovery interface based on received display data.

The second display screen S2 is in an outward-bending state, and the second display sub-screen S2b faces the user.

As shown in FIG. 6, in a system recovery scenario of a terminal, the following steps are performed.

Step 301: Start a system recovery program.

Step 302: Restart the terminal, and determine a primary screen/a secondary screen at a power-on moment.

Step 303: In a restart phase of the terminal, the primary screen/the secondary screen simultaneously displays a recovery icon.

Step 304: Enter a system recovery phase, and determine the primary screen/the secondary screen at an entering moment.

Step 305: In the system recovery phase, the secondary screen displays the recovery icon at the same time when the primary screen displays a recovery interface.

Step 306: System recovery ends.

Steps 301 to 306 are specifically described as follows.

Before dual-screen display, at least a part of a primary screen image and at least a part of a secondary screen image, for example, a static logo, may be generated in advance, and data of the at least a part of the primary screen image and data of the at least a part of the secondary screen image are respectively buffered in a first buffer and a second buffer.

A current bending status of a second display screen S2 of the terminal is determined based on an internal sensor of the terminal. If it is detected that the second display screen S2 is bent outwards and is in a fully folded state (a first display screen S1 is covered on the inner side of the terminal, and a first display sub-screen S2a and a second display sub-screen S2b on two sides of the terminal are visible to a user), and it is detected that the second display sub-screen S2b faces the user (as shown in FIG. 1F), the second display sub-screen S2b is set to the primary screen, and the first display sub-screen S2a and the first display screen S1 are set to secondary screens.

In a Terminal Restart Process for System Recovery

Specifically, the primary screen image may be obtained from the first buffer, where the primary screen image may include a dynamic logo (the recovery icon, for example, a dynamic "wrench" icon); and the secondary screen image may be obtained from the second buffer, where the secondary screen image is a static logo (for example, a static "wrench" icon). When the primary screen/the secondary screens is/are determined, before display sending, display control modules and display screen modules of the secondary screens (the first display screen S1 and the second display sub-screen S2b) may be first controlled to be powered on and initialized. The switching switch K1 may be controlled to be switched to the first display screen S1, so that the first display interface DSI 1 is connected to the first display screen S1 and the static logo may be transmitted to the first display screen S1 The switching switch K1 may be controlled to be switched to the first display sub-screen S2*a*, so that the first display interface DSI 1 is connected to the first display sub-screen S2*a*; and the static logo may be transmitted to the first display sub-screen S2*a*, so that the first display screen S1 and the first display sub-screen S2*a* separately display the static logo.

After it is ensured that the secondary screen displays the static logo, no new display image is transmitted to the secondary screen. The secondary screen keeps displaying the static logo in a self-refresh mode of the secondary screen before system recovery and restart of the terminal are completed. At the same time when the first display interface DSI 1 transmits a display image to the secondary screen, the second display interface DSI 2 may be controlled to transmit the dynamic logo to the second display sub-screen S2*b*, and the second display interface DSI 2 is controlled to continuously send display to the second display sub-screen S2*b*, so that in a phase of system recovery and restart of the terminal, the second display sub-screen S2*b* continuously refreshes an image based on data transmitted through the second display interface DSI 2, to implement simultaneous display of the primary screen and the secondary screen in the terminal restart process for system recovery.

After restart is completed and a system recovery program is started

After restart is completed and the system recovery program is started, the switching switch K1 is controlled to be switched to the first display screen S1, so that the first display interface DSI 1 is connected to the first display screen S1 and the static logo is transmitted to the first display screen S1, to complete one-time display sending. Then, the switching switch is controlled to be switched to the first display sub-screen S2*a*, so that the first display interface DSI 1 is connected to the first display sub-screen S2*a*; and the static logo is transmitted to the first display sub-screen S2*a*, to complete one-time display sending. The secondary screen enters a self-refresh mode based on received data. Before the system recovery program ends, the secondary screen keeps displaying the static logo (the static "wrench") through self-refreshing.

At the same time when the first display interface DSI 1 transmits a display image to the secondary screen, the second display interface DSI 2 may be controlled to normally send display to the second display sub-screen S2*b*, that is, transmit a system recovery interface drawn in real time. The second display sub-screen S2*b* displays the system recovery interface based on received display data.

The foregoing describes related content of Embodiment 2. In Embodiment 2, power-off charging and system recovery are separately used as examples. The display control method is also applicable to another scenario. This is not limited herein.

It should be noted that, in the display control method provided in embodiments of the present invention, in the dual-screen display phase, the secondary screen does not display only the static logo. The switching switch K1 may be controlled to be frequently switched between the first display screen S1 and the first display sub-screen S2*a* based on a display requirement. The first display interface DSI 1 frequently transmits a display image to each of the first display screen S1 and the first display sub-screen S2*a*. For example, the first display screen S1 and the first display sub-screen S2*a* evenly occupy the first display interface DSI 1, so that a frame rate of the first display screen S1 is the same as a frame rate of the first display sub-screen S2*a*. At the same time when the first display interface DSI 1 transmits a display image to the first display sub-screen S2*a*, the second display interface DSI 2 synchronously transmits a display image to the second display sub-screen S2*b*, so that the frame rate of the first display screen S1 is the same as a frame rate of the second display screen S2 formed by the first display sub-screen S2*a* and the second display sub-screen S2*b*. In the foregoing manner, the primary screen and the secondary screen may simultaneously display corresponding images (for example, simultaneously display non-static images). Time for occupying the first display interface DSI 1 by the first display screen S1 and the first display sub-screen S2*a* is not limited to the foregoing even occupation, and may be correspondingly adjusted based on an actual requirement.

Figure 7:
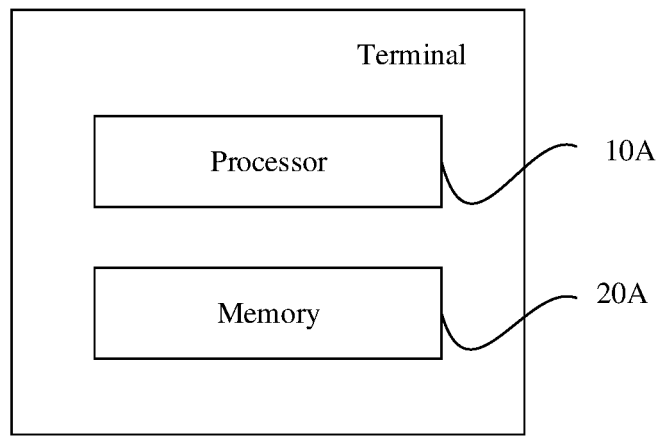
FIG. 7 is a schematic diagram of a structure of a terminal according to an embodiment of the present invention.

FIG. 7 is a schematic diagram of a structure of a terminal according to an embodiment of the present invention. As shown in FIG. 7, the terminal includes a processor 10A and a memory 20A. The memory 20A is configured to store at least one instruction, and when the instruction is loaded and executed by the processor 10A, the display control method provided in embodiments of the present invention is implemented.

Figure 8:
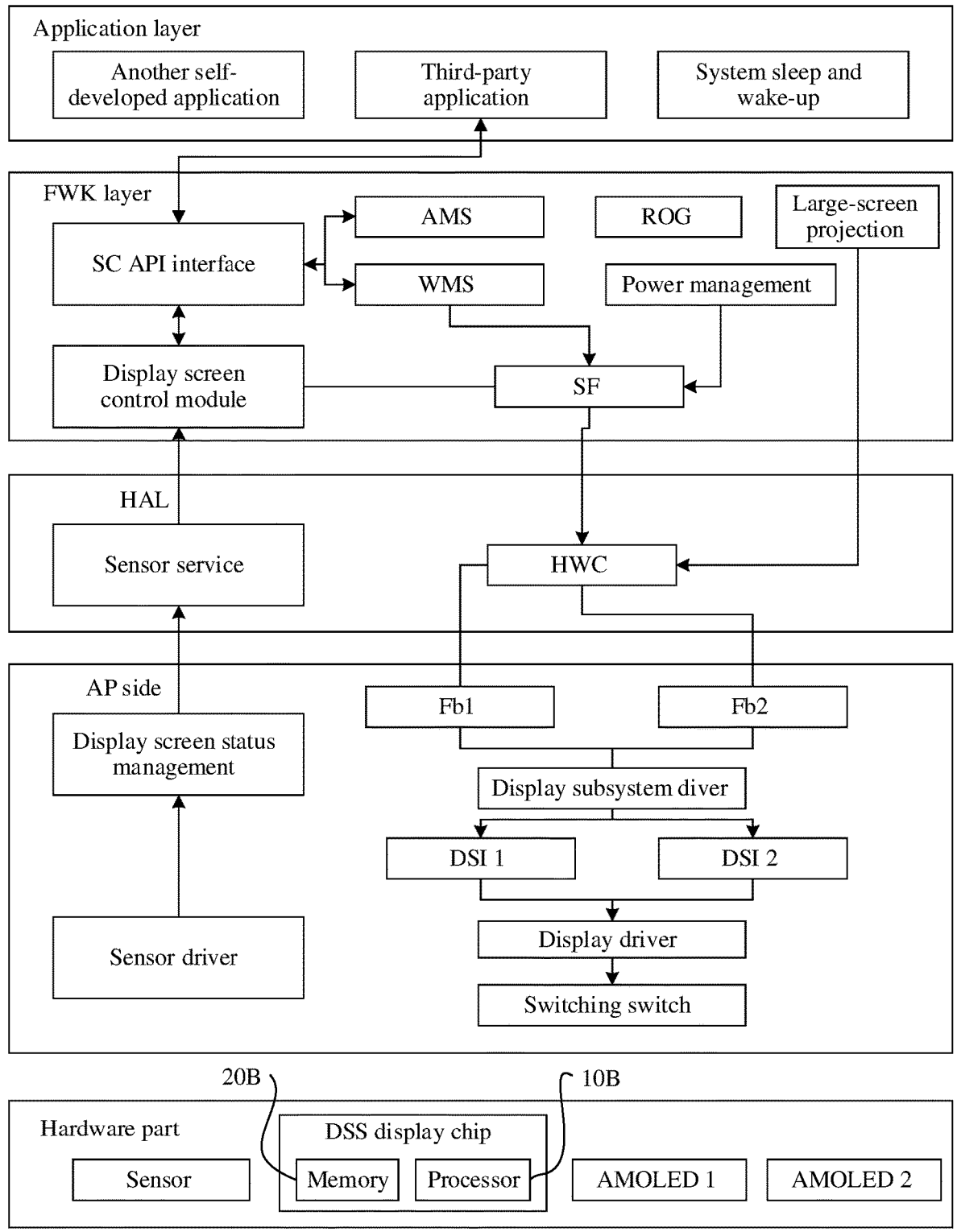
FIG. 8 is a schematic diagram of a system architecture of a terminal according to an embodiment of the present invention.

An embodiment of the present invention further provides a terminal, and the terminal has a schematic diagram of a system framework of a terminal shown in FIG. 8. As shown in FIG. 8, the system framework includes an application layer, a framework (FWK, Framework) layer, a hardware abstraction layer (HAL, hardware abstraction layer), an application processor (AP, Application Processor) side, and a hardware part. Specifically, the application layer includes another self-developed application, a third-party application, and system sleep and wake-up. The FWK layer includes an SC API interface and a display control module. The FWK layer further provides services such as an activity management service (AMS, Activity Management Service), a window management service (WMS, Window Management Service), power management, and large-screen projection. The HAL provides a sensor service and an image data combination and display function (HWC, Hwcomposer). The AP side is configured to perform display screen status management (for example, setting a primary screen/a secondary screen) based on a parameter of a sensor. A display subsystem (DSS, Display Subsystem) may further control a switching switch (SWITCH) K1 to be switched between a first display screen S1 and a first display sub-screen S2*a* for connection in a time-division manner, so that a first display interface DSI 1 is connected to the first display screen S1 and the first display sub-screen S2*a* in a time-division manner; and control a second display interface DSI 2 to transmit a display image to a second display sub-screen S2*b*, so that a primary screen image fb1 and a secondary screen image fb2 are respectively transmitted to the corresponding primary screen and the corresponding secondary screen, to implement simultaneous display of the primary screen and the secondary screen in a dual-screen display phase. The hardware part includes a corresponding sensor, a DSS display chip, a first organic light emitting display screen (AMOLED 1), and a second organic light emitting display screen (AMOLED 2). The DSS display chip may include a processor 10B and a memory 20B. The memory 20B may store at least one instruction. When the instruction is loaded and executed by the processor 10B, the display control method provided in embodiments of the present invention is implemented.

It should be noted that the terminal in embodiments of the present invention may include, but is not limited to a personal computer (Personal Computer, PC), a personal digital assistant (Personal Digital Assistant, PDA), a wireless handheld device, a tablet computer (Tablet Computer), a mobile phone, an MP3 player, an MP4 player, or the like. The display screen in embodiments of the present invention is an LCD display screen or an OLED display screen.

An embodiment of the present invention further provides a computer-readable storage medium, where the computer-readable storage medium stores a computer program, and when the computer program is executed by a processor, the display control method shown in FIG. 2 is implemented.

It may be understood that the application may be an application program (nativeApp) installed on a terminal, or may be a web program (webApp) of a browser on a terminal. This is not limited in embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present invention, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of hardware plus a software functional unit.

When the integrated unit is implemented in a form of a software functional unit, the integrated unit may be stored in a computer-readable storage medium. The software functional unit is stored in a storage medium and includes several instructions for instructing a computer apparatus (which may be a personal computer, a server, a network apparatus, or the like) or a processor (Processor) to perform a part of the steps of the methods described in embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely example embodiments of the present invention, but are not intended to limit the present invention. Any modification, equivalent replacement, or improvement made without departing from the spirit and principle of the present invention shall fall within the protection scope of the present invention.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to a part or all of technical features thereof, without departing from the scope of the technical solutions of embodiments of the present invention.

What is claimed is:

1. A method, applied to a terminal having a first display screen and a second display screen, wherein the second display screen is a foldable screen, the second display screen comprises a first display sub-screen and a second display sub-screen, and when the second display screen is in an unfolded state, a light emitting direction of the first display screen is opposite to a light emitting direction of the second display screen; and the method comprises:
    in response to a dual-screen display instruction, entering a dual-screen display phase;
    in the dual-screen display phase,
        controlling to switch a first display interface of the terminal between connecting to the first display screen and connecting to the first display sub-screen in a time-division manner; and
        when the first display interface is switched to connect to the first display screen, transmitting data of a first image to the first display screen through the first display interface, and when the first display interface is switched to connect to the first display sub-screen, transmitting data of a second image to the first display sub-screen through the first display interface, such that the first display sub-screen displays the second image at a same time when the first display screen displays the first image.

2. The method according to claim 1, wherein in the dual-screen display phase, the method further comprises:
    generating a primary screen image and a secondary screen image; and
    determining a current bending status of the second display screen, determining a primary screen and a secondary screen based on the current bending status of the second display screen, displaying the primary screen image on the primary screen, and displaying the secondary screen image on the secondary screen.

3. The method according to claim 2, wherein the method further comprises:
    when the second display screen is in an inward-bending state, setting the first display screen as the primary screen, and setting the first display sub-screen and the second display sub-screen as secondary screens, wherein the first image is the primary screen image, and the second image is the secondary screen image;
    when the first display interface is switched to connect to the first display screen, transmitting data of the primary screen image to the first display screen through the first display interface, and when the first display interface is switched to connect to the first display sub-screen, transmitting data of the secondary screen image to the first display sub-screen through the first display interface, such that the first display sub-screen displays the secondary screen image at a same time when the first display screen displays the primary screen image; and transmitting data of a third image to the second display sub-screen through a second display interface, to display the third image on the second display sub-screen, wherein the third image is the secondary screen image, and the first display sub-screen and the second display sub-screen respectively perform self-refresh displaying based on the secondary screen image received by the first display sub-screen and the secondary screen image received by the second display sub-screen.

4. The method according to claim 2, wherein the method further comprises:

when the second display screen is in an inward-bending state, setting the first display screen as the primary screen, and setting the first display sub-screen and the second display sub-screen as secondary screens, wherein the first image is the primary screen image, and the second image is the secondary screen image;

when the first display interface is switched to connect to the first display screen, transmitting data of the primary screen image to the first display screen through the first display interface, and when the first display interface is switched to connect to the first display sub-screen, transmitting data of a first part of the secondary screen image to the first display sub-screen through the first display interface, such that the first display sub-screen displays the first part of the secondary screen image at a same time when the first display screen displays the primary screen image; and transmitting data of a third image to the second display sub-screen through a second display interface, to display the third image on the second display sub-screen, wherein the third image is a second part of the secondary screen image, the second display screen formed by the first display sub-screen and the second display sub-screen displays a complete image of the secondary screen image, and the first display sub-screen and the second display sub-screen respectively perform self-refresh displaying based on the first part of the secondary screen image received by the first display sub-screen and the second part of the secondary screen image received by the second display sub-screen.

5. The method according to claim 2, wherein the method further comprises:

when the second display screen is in the unfolded state, setting the second display screen as the primary screen, and setting the first display screen as the secondary screen, wherein the first image is the secondary screen image, and the second image is a part of the primary screen image;

when the first display interface is switched to connect to the first display screen, transmitting data of the secondary screen image to the first display screen through the first display interface, wherein the first display screen performs self-refresh displaying based on the secondary screen image, and when the first display interface is switched to connect to the first display sub-screen, transmitting data of a first part of the primary screen image to the first display sub-screen through the first display interface, such that the first display sub-screen displays the first part of the primary screen image at a same time when the first display screen displays the secondary screen image; and transmitting data of a third image to the second display sub-screen through a second display interface, to display the third image on the second display sub-screen, wherein the third image is a second part of the primary screen image, and the second display screen formed by the first display sub-screen and the second display sub-screen displays a complete image of the primary screen image.

6. The method according to claim 1, wherein in the dual-screen display phase, the method further comprises:

generating a primary screen image and a secondary screen image; and determining a current bending status of the second display screen and an orientation of the terminal, determining a primary screen and a secondary screen based on the current bending status of the second display screen and the orientation of the terminal, displaying the primary screen image on the primary screen, and displaying the secondary screen image on the secondary screen.

7. The method according to claim 6, wherein the method further comprises:

when the second display screen is in the unfolded state, and the second display screen faces a user, setting the second display screen as the primary screen, and setting the first display screen as the secondary screen, wherein the first image is the secondary screen image, and the second image is a part of the primary screen image;

when the first display interface is switched to connect to the first display screen, transmitting data of the secondary screen image to the first display screen through the first display interface, wherein the first display screen performs self-refresh displaying based on the secondary screen image, and when the first display interface is switched to connect to the first display sub-screen, transmitting data of a first part of the primary screen image to the first display sub-screen through the first display interface, such that the first display sub-screen displays the secondary screen image at a same time when the first display screen displays the first part of the primary screen image; and transmitting data of a third image to the second display sub-screen through a second display interface, to display the third image on the second display sub-screen, wherein the third image is a second part of the primary screen image, and the second display screen formed by the first display sub-screen and the second display sub-screen displays a complete image of the primary screen image.

8. The method according to claim 6, wherein the method further comprises:

when the second display screen is in the unfolded state, and the first display screen faces a user, setting the first display screen as the primary screen, and setting the second display screen as the secondary screen;

when the first display interface is switched to connect to the first display screen, transmitting data of the primary screen image to the first display screen through the first display interface, and when the first display interface is switched to connect to the first display sub-screen, transmitting data of a first part of the secondary screen image to the first display sub-screen through the first display interface, such that the first display sub-screen displays the first part of the secondary screen image at a same time when the first display screen displays the primary screen image; and transmitting data of a third image to the second display sub-screen through a second display interface to display the third image on the second display sub-screen, wherein the third image is a second part of the secondary screen image, the second display screen formed by the first display sub-screen and the second display sub-screen displays a complete image of the secondary screen image, and the first display sub-screen and the second display sub-screen respectively perform self-refresh displaying based on the first part of the secondary screen image received by the first display sub-screen and the second part of the secondary screen image received by the second display sub-screen.

9. The method according to claim 6, wherein the method further comprises:
when the second display screen is in an outward-bending state, and the first display sub-screen faces a user, setting the first display sub-screen as the primary screen, and setting the first display screen and the second display sub-screen as secondary screens;
when the first display interface is switched to connect to the first display screen, transmitting data of the secondary screen image to the first display screen through the first display interface, and when the first display interface is switched to connect to the first display sub-screen, transmitting data of the primary screen image to the first display sub-screen through the first display interface, such that the first display sub-screen displays the primary screen image at a same time when the first display screen displays the secondary screen image; and
transmitting data of a third image to the second display sub-screen through a second display interface, to display the third image on the second display sub-screen, wherein the third image is the secondary screen image, and the first display screen and the second display sub-screen respectively perform self-refresh displaying based on the secondary screen image received by the first display screen and the secondary screen image received by the second display sub-screen.

10. The method according to claim 6, wherein the method further comprises:
when the second display screen is in an outward-bending state, and the second display sub-screen faces a user, setting the second display sub-screen as the primary screen, and setting the first display screen and the first display sub-screen as secondary screens;
when the first display interface is switched to connect to the first display screen, transmitting data of the secondary screen image to the first display screen through the first display interface, and when the first display interface is switched to connect to the first display sub-screen, transmitting data of the secondary screen image to the first display sub-screen through the first display interface, such that the first display sub-screen displays the secondary screen image at a same time when the first display screen displays the secondary screen image; and
transmitting data of a third image to the second display sub-screen through a second display interface, to display the third image on the second display sub-screen, wherein the third image is the primary screen image, and the first display screen and the first display sub-screen respectively perform self-refresh displaying based on the secondary screen image received by the first display screen and the secondary screen image received by the first display sub-screen.

11. A terminal comprising:
a first display screen and a second display screen, wherein the second display screen is a foldable screen, the second display screen comprises a first display sub-screen and a second display sub-screen, when the second display screen is in an unfolded state, a light emitting direction of the first display screen is opposite to a light emitting direction of the second display screen; and
a processor and a non-transitory memory; and
wherein the processor is configured to execute a program or instructions stored in the memory to cause the terminal to perform:
in response to a dual-screen display instruction, entering a dual-screen display phase;
in the dual-screen display phase,
controlling to switch a first display interface of the terminal between connecting to the first display screen and connecting to the first display sub-screen in a time-division manner; and
when the first display interface is switched to connect to the first display screen, transmitting data of a first image to the first display screen through the first display interface, and when the first display interface is switched to connect to the first display sub-screen, transmitting data of a second image to the first display sub-screen through the first display interface, such that the first display sub-screen displays the second image at a same time when the first display screen displays the first image.

12. The terminal according to claim 11, wherein in the dual-screen display phase, the terminal is further caused to perform:
generating a primary screen image and a secondary screen image; and
determining a current bending status of the second display screen, determining a primary screen and a secondary screen based on the current bending status of the second display screen, displaying the primary screen image on the primary screen, and displaying the secondary screen image on the secondary screen.

13. The terminal according to claim 12, wherein the terminal is further caused to perform:
when the second display screen is in an inward-bending state, setting the first display screen as the primary screen, and setting the first display sub-screen and the second display sub-screen as secondary screens, wherein the first image is the primary screen image, and the second image is the secondary screen image;
when the first display interface is switched to connect to the first display screen, transmitting data of the primary screen image to the first display screen through the first display interface, and when the first display interface is switched to connect to the first display sub-screen, transmitting data of the secondary screen image to the first display sub-screen through the first display interface, such that the first display sub-screen displays the secondary screen image at a same time when the first display screen displays the primary screen image; and
transmitting data of a third image to the second display sub-screen through a second display interface, to display the third image on the second display sub-screen, wherein the third image is the secondary screen image, and the first display sub-screen and the second display sub-screen respectively perform self-refresh displaying based on the secondary screen image received by the first display sub-screen and the secondary screen image received by the second display sub-screen.

14. The terminal according to claim 12, wherein the terminal is further caused to perform:
when the second display screen is in an inward-bending state, setting the first display screen as the primary screen, and setting the first display sub-screen and the second display sub-screen as secondary screens, wherein the first image is the primary screen image, and the second image is the secondary screen image;

when the first display interface is switched to connect to the first display screen, transmitting data of the primary screen image to the first display screen through the first display interface, and when the first display interface is switched to connect to the first display sub-screen, transmitting data of a first part of the secondary screen image to the first display sub-screen through the first display interface, such that the first display sub-screen displays the first part of the secondary screen image at a same time when the first display screen displays the primary screen image; and transmitting data of a third image to the second display sub-screen through a second display interface, to display the third image on the second display sub-screen, wherein the third image is a second part of the secondary screen image, the second display screen formed by the first display sub-screen and the second display sub-screen displays a complete image of the secondary screen image, and the first display sub-screen and the second display sub-screen respectively perform self-refresh displaying based on the first part of the secondary screen image received by the first display sub-screen and the second part of the secondary screen image received by the second display sub-screen.

15. The terminal according to claim 12, wherein the terminal is further caused to perform:

when the second display screen is in the unfolded state, setting the second display screen as the primary screen, and setting the first display screen as the secondary screen, wherein the first image is the secondary screen image, and the second image is a part of the primary screen image;

when the first display interface is switched to connect to the first display screen, transmitting data of the secondary screen image to the first display screen through the first display interface, wherein the first display screen performs self-refresh displaying based on the secondary screen image, and when the first display interface is switched to connect to the first display sub-screen, transmitting data of a first part of the primary screen image to the first display sub-screen through the first display interface, such that the first display sub-screen displays the first part of the primary screen image at a same time when the first display screen displays the secondary screen image; and transmitting data of a third image to the second display sub-screen through a second display interface, to display the third image on the second display sub-screen, wherein the third image is a second part of the primary screen image, and the second display screen formed by the first display sub-screen and the second display sub-screen displays a complete image primary screen image.

16. The terminal according to claim 11, wherein in the dual-screen display phase, the terminal is further caused to perform:

generating a primary screen image and a secondary screen image; and determining a current bending status of the second display screen and an orientation of the terminal, determining a primary screen and a secondary screen based on the current bending status of the second display screen and the orientation of the terminal, displaying the primary screen image on the primary screen, and displaying the secondary screen image on the secondary screen.

17. A non-transitory computer-readable storage medium, wherein the computer-readable storage medium comprises a program, and when the program runs on a terminal, the terminal is caused to perform:

in response to a dual-screen display instruction, entering a dual-screen display phase;

in the dual-screen display phase, controlling to switch a first display interface of the terminal between connecting to a first display screen of the terminal and connecting to a first display sub-screen of the terminal in a time-division manner, the terminal comprising the first display screen and a second display screen, wherein the second display screen is a foldable screen and comprises the first display sub-screen and a second display sub-screen, and when the second display screen is in an unfolded state, a light emitting direction of the first display screen is opposite to a light emitting direction of the second display screen; and when the first display interface is switched to connect to the first display screen, transmitting data of a first image to the first display screen through the first display interface, and when the first display interface is switched to connect to the first display sub-screen, transmitting data of a second image to the first display sub-screen through the first display interface, such that the first display sub-screen displays the second image at a same time when the first display screen displays the first image.

18. The computer-readable storage medium according to claim 17, wherein in the dual-screen display phase, the terminal is further caused to perform:

generating a primary screen image and a secondary screen image; and determining a current bending status of the second display screen, determining a primary screen and a secondary screen based on the current bending status of the second display screen, displaying the primary screen image on the primary screen, and displaying the secondary screen image on the secondary screen.

19. The computer-readable storage medium according to claim 18, wherein the terminal is further caused to:

when the second display screen is in an inward-bending state, setting the first display screen as the primary screen, and setting the first display sub-screen and the second display sub-screen as secondary screens, wherein the first image is the primary screen image, and the second image is the secondary screen image;

when the first display interface is switched to connect to the first display screen, transmitting data of the primary screen image to the first display screen through the first display interface, and when the first display interface is switched to connect to the first display sub-screen, transmitting data of the secondary screen image to the first display sub-screen through the first display interface, such that the first display sub-screen displays the secondary screen image at a same time when the first display screen displays the primary screen image; and transmitting data of a third image to the second display sub-screen through a second display interface, to display the third image on the second display sub-screen, wherein the third image is the secondary screen image, and the first display sub-screen and the second display sub-screen respectively perform self-refresh displaying based on the secondary screen image received by the first display sub-screen and the secondary screen image received by the second display sub-screen.

20. The computer-readable storage medium according to claim 18, wherein the terminal is further caused to perform:

when the second display screen is in an inward-bending state, setting the first display screen as the primary screen, and setting the first display sub-screen and the second display sub-screen as secondary screens, wherein the first image is the primary screen image, and the second image is the secondary screen image;

when the first display interface is switched to connect to the first display screen, transmitting data of the primary screen image to the first display screen through the first display interface, and when the first display interface is switched to connect to the first display sub-screen, transmitting data of a first part of the secondary screen image to the first display sub-screen through the first display interface, such that the first display sub-screen displays the first part of the secondary screen image at a same time when the first display screen displays the primary screen image; and transmitting data of a third image to the second display sub-screen through a second display interface, to display the third image on the second display sub-screen, wherein the third image is a second part of the secondary screen image, the second display screen formed by the first display sub-screen and the second display sub-screen displays a complete image of the secondary screen image, and the first display sub-screen and the second display sub-screen respectively perform self-refresh displaying based on the first part of the secondary screen image received by the first display sub-screen and the second part of the secondary screen image received by the second display sub-screen.

* * * * *